US007917850B2

(12) United States Patent
Murayama

(10) Patent No.: US 7,917,850 B2

(45) Date of Patent: Mar. 29, 2011

(54) DOCUMENT MANAGING SYSTEM AND METHOD THEREOF

(75) Inventor: Tsutomu Murayama, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 1060 days.

(21) Appl. No.: 11/573,710

(22) PCT Filed: Aug. 31, 2005

(86) PCT No.: PCT/JP2005/016366

§ 371 (c)(1), (2), (4) Date: Feb. 14, 2007

(87) PCT Pub. No.: WO2006/025590

PCT Pub. Date: Mar. 9, 2006

(65) Prior Publication Data

US 2008/0098303 A1 Apr. 24, 2008

(30) Foreign Application Priority Data

Sep. 3, 2004 (JP) ................................ 2004-257422

(51) Int. Cl.
*G06F 17/00* (2006.01)

(52) U.S. Cl. ....................................... 715/255; 715/274

(58) Field of Classification Search .................. 715/255, 715/273, 274

See application file for complete search history.

(56) References Cited

U.S. PATENT DOCUMENTS

| | | | | |
|---|---|---|---|---|
| 5,790,119 | A * | 8/1998 | Sklut et al. | 715/839 |
| 7,085,998 | B2 * | 8/2006 | Kofman et al. | 715/235 |
| 7,266,807 | B2 | 9/2007 | Takano et al. | |
| 7,295,336 | B2 * | 11/2007 | Yoshida et al. | 358/1.15 |
| 7,366,980 | B2 * | 4/2008 | Small | 715/248 |
| 2002/0016803 | A1 * | 2/2002 | Ryan et al. | 707/527 |
| 2002/0035941 | A1 * | 3/2002 | Nakao | 101/484 |
| 2002/0080180 | A1 * | 6/2002 | Mander et al. | 345/769 |
| 2002/0097432 | A1 * | 7/2002 | Kumashio | 358/1.15 |
| 2002/0171857 | A1 * | 11/2002 | Hisatomi et al. | 358/1.13 |
| 2004/0139402 | A1 * | 7/2004 | Azami | 715/527 |

FOREIGN PATENT DOCUMENTS

| | | |
|---|---|---|
| JP | 8186594 | 7/1996 |
| JP | 2001166907 | 6/2001 |
| JP | 2001-350606 | 12/2001 |
| JP | 2001350606 | 12/2001 |
| JP | 2002133392 | 5/2002 |
| JP | 2003167697 | 6/2003 |
| JP | 2003316539 | 11/2003 |
| JP | 2004199577 | 7/2004 |

OTHER PUBLICATIONS

Office Action, dated Mar. 31, 2008, in KR 10-2007-7007644.

* cited by examiner

*Primary Examiner* — Laurie Ries

(74) *Attorney, Agent, or Firm* — Fitzpatrick, Cella, Harper & Scinto

(57) ABSTRACT

For each of documents or folders containing the documents, setting data on a plurality of setting items in a print settings window for printing the document and display setting data on the print settings window are stored. When an instruction is provided to print a document, the print settings window for the document is displayed on the basis of the setting data and display modification data, and the display modification data for the print settings window is stored according change or addition of a setting item in the print settings window.

9 Claims, 24 Drawing Sheets

F I G. 1
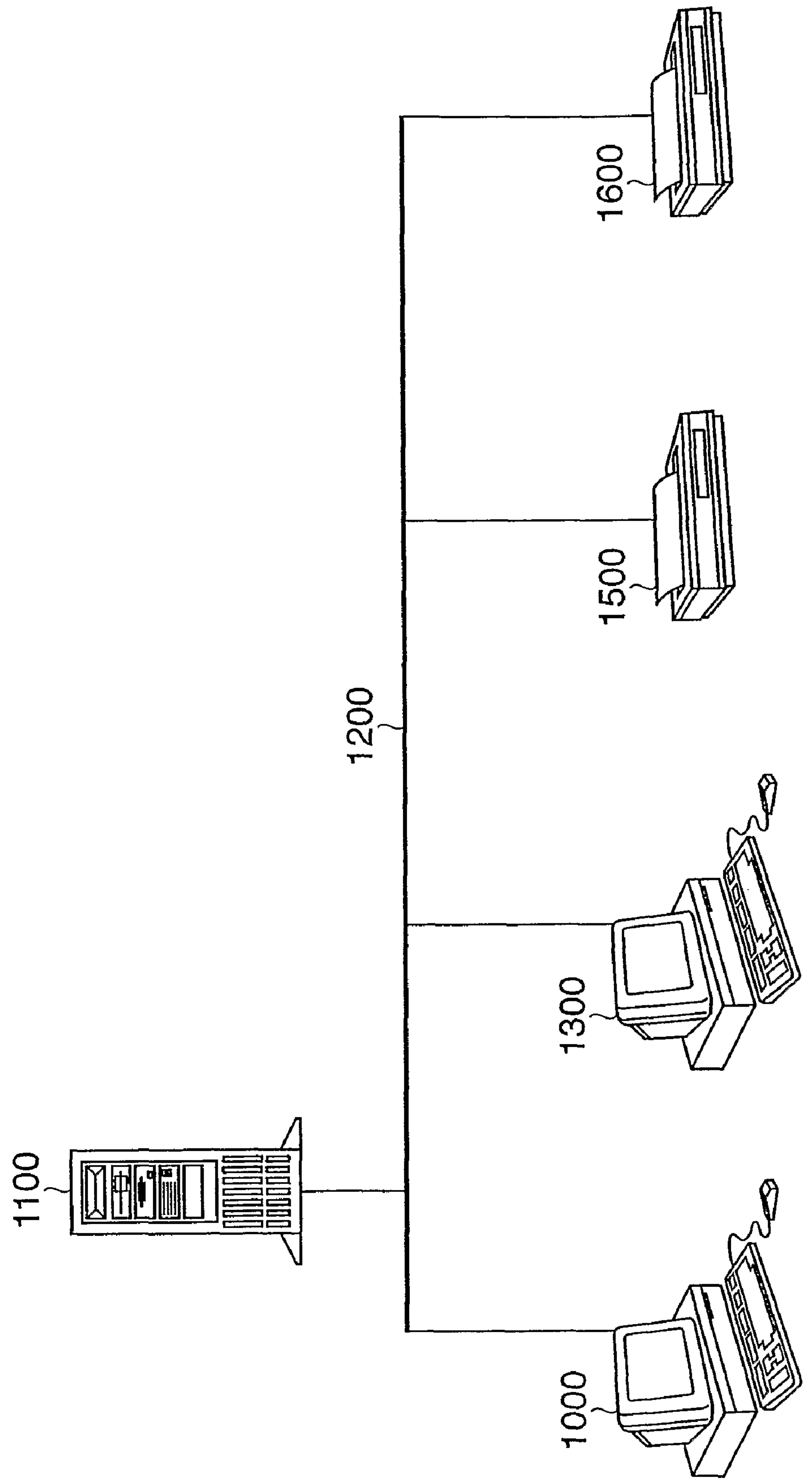

FIG. 9B

```
<?xml version= " 1.0 " encoding= " Shift_JIS " ?>
 <printset>
 <item>
   <title> PRINT COPIES </title>
   <class> edit box </class>
   <value> 1 </value>
   <size> small </size>
 </item>
 <item>
   <title> PAGE RANGE </title>
   <class> radio button </class>
     <radioitem> ALL </radioitem>
     <radioitem> CURRENT PAGE </radioitem>
     <radioitem> PAGE DESIGNATION </radioitem>
       <subclass> edit box </subclass>
   <value> all </value>
   <size> small </size>
  <item>
 </item>
   <title> STAMP </title>
   <class> dropdown listbox </class>
     <listitem> NONE </listitem>
     <listitem> APPROVE </listitem>
    <listitem> REJECT </listitem>
  <value> APPROVE </value>
  <size> small </size>
 </item>
</printset>
```

810 XML DECLARATION PORTION

811

812

813

814 XML INSTANCE PORTION

```
<?xml version= " 1.0 " encoding= " shift_jis " ?>
<xsl : stylesheet version= " 1.0 "
xmlns : xsl= " http//www.w3.org/1999/XSL/Transform " >
 <xsl : template match= " / " >
  <printset>
   <xsl : apply-template select= " //item " />
  </printset>
 </xsl : template>
 <xsl : template match= " item " >
  <xsl : choose>
   <xsl : when test= " title=PRINT COPIES " >
    <item>
     <title>
     <xsl : value-of select= " _ " />
     </title>
     <class>
     <xsl : value-of select= " class " />
     </class>
     <value>
      10
     </value>
     <size>
      large
     </size>
    </item>
   <xsl : when>
   <xsl : otherwise>
   </xsl : otherwise>
  </xsl : choose>
 </xsl : template>
</xsl : stylesheet>
```

134 XML DECLARATION PORTION

135 XML INSTANCE PORTION

136

137

138

139

130

DOCUMENT MANAGING SYSTEM AND METHOD THEREOF

TECHNICAL FIELD

The present invention relates to a document managing system in which management and printing of documents are performed and a method thereof.

BACKGROUND ART

Document managing systems in which a device capable of reading a document through a local area network (LAN), a server for management of documents, a printer and a client such as a personal computer (PC) for use with the device and so on are connected to each other are constructed in offices, etc. In such document managing systems, when an instruction to print a document is provided from a client, a print settings window for setting various print setting items is displayed on the client, and settings of the various setting items are made while viewing the print setting window. In such a print setting window, setting items are uniformly arranged and no function has been provided to enable a user to change and modify the layout of the print settings window according to various requirements, for example, according to whether or not a folder to be printed includes a document or what the contents of the document are.

A method of limiting setting items with respect to each of users by storing for each user information as to whether or not each setting item in a print settings window will be displayed for the user is known. For example, Japanese Patent Laid-Open No. 2002-133392 discloses such a method.

On the other hand, there has been a demand for a document managing system designed to improve the efficiency of user operations by enabling a print settings window to be changed with respect to each of documents, each of folders in which the documents are registered, or each of work flow processes in which the documents are processed, when the print settings window is displayed.

DISCLOSURE OF INVENTION

It is an object of the present invention to overcome the drawbacks of the prior arts.

The present invention provides a document managing system in which setting items and display setting data for a print settings window are stored for each of documents or folders in which documents are registered, and in which display of the print settings window is changed according to addition or change of setting items, and a method of controlling the document managing system.

According to first aspect of the present invention, there is provided with a document managing system for managing documents registered in a database, the system comprising:

setting data storage means for storing, for each of documents or folders containing the documents, setting data on a plurality of setting items in a print settings window for printing the document;

display setting storage means for storing display setting data on the print setting window;

display setting modification storage means for storing display modification data on the print settings window, in a case where an instruction is provided to change the setting items stored in the setting data storage means or to add a setting item; and print setting display means for displaying the print settings window for the document on the basis of the setting data stored in the setting data storage means and the display modification data stored in the display setting modification storage means, in a case where an instruction is provided to print the document. According to second aspect of the present invention, there is provided with an information processing apparatus for registering documents in a database and managing the documents, the apparatus comprising:

setting data storage means for storing, for each of documents or storage area containing the documents, setting data on a plurality of setting items in a print settings window for printing the document;

display setting storage means for storing display setting data of the print setting window;

display setting modification storage means for storing display modification data of the print settings window in a case where an instruction is provided to change the setting items stored in the display setting storage means or to add a setting item; and print setting display means for displaying the print settings window for the document on the basis of the setting data stored in the setting data storage means and the display modification data stored in the display setting modification storage means, in a case where an instruction is provided to print the document.

Other features, objects and advantages of the present invention will be apparent from the following description when taken in conjunction with the accompanying drawings, in which like reference characters designate the same or similar parts throughout the figures thereof.

BRIEF DESCRIPTION OF DRAWINGS

The accompanying drawings, which are incorporated in and constitute a part of the specification, illustrate embodiments of the invention and, together with the description, serve to explain the principles of the invention.

FIG. 1 is a diagram showing the configuration of a document managing system according to an embodiment of the present invention;

FIGS. 9A and 9B depict views for explaining print setting in a client according to the embodiment;

FIGS. 12A and 12B depict views for explaining print setting in the client according to the embodiment;

BEST MODE FOR CARRYING OUT THE INVENTION

The present invention will be described with respect to preferred embodiments thereof with reference to the accompanied drawings. The embodiments described below, however, are not limiting of the invention set forth in the appended claims, and all combinations of features described in the description of the embodiment are not necessarily indispensable to the solution according to the present invention.

FIG. 1 is a diagram showing the configuration of a document managing system according to an embodiment of the present invention.

This document managing system is controlled by a client-server-type application which runs on an OS for personal computers, and is capable of taking in documents from a device such as a scanner or files managed by the OS and performing management and printing of the documents. Each of clients 1000 and 1300 is constituted by an ordinary personal computer or the like and connected to a server 1100 and printers 1500 and 1600 via a network 1200. From each of the clients 1000 and 1300, a document stored in the document managing system can be printed by using the printing apparatus (printer) 1500 or 1600.

Figure 2:
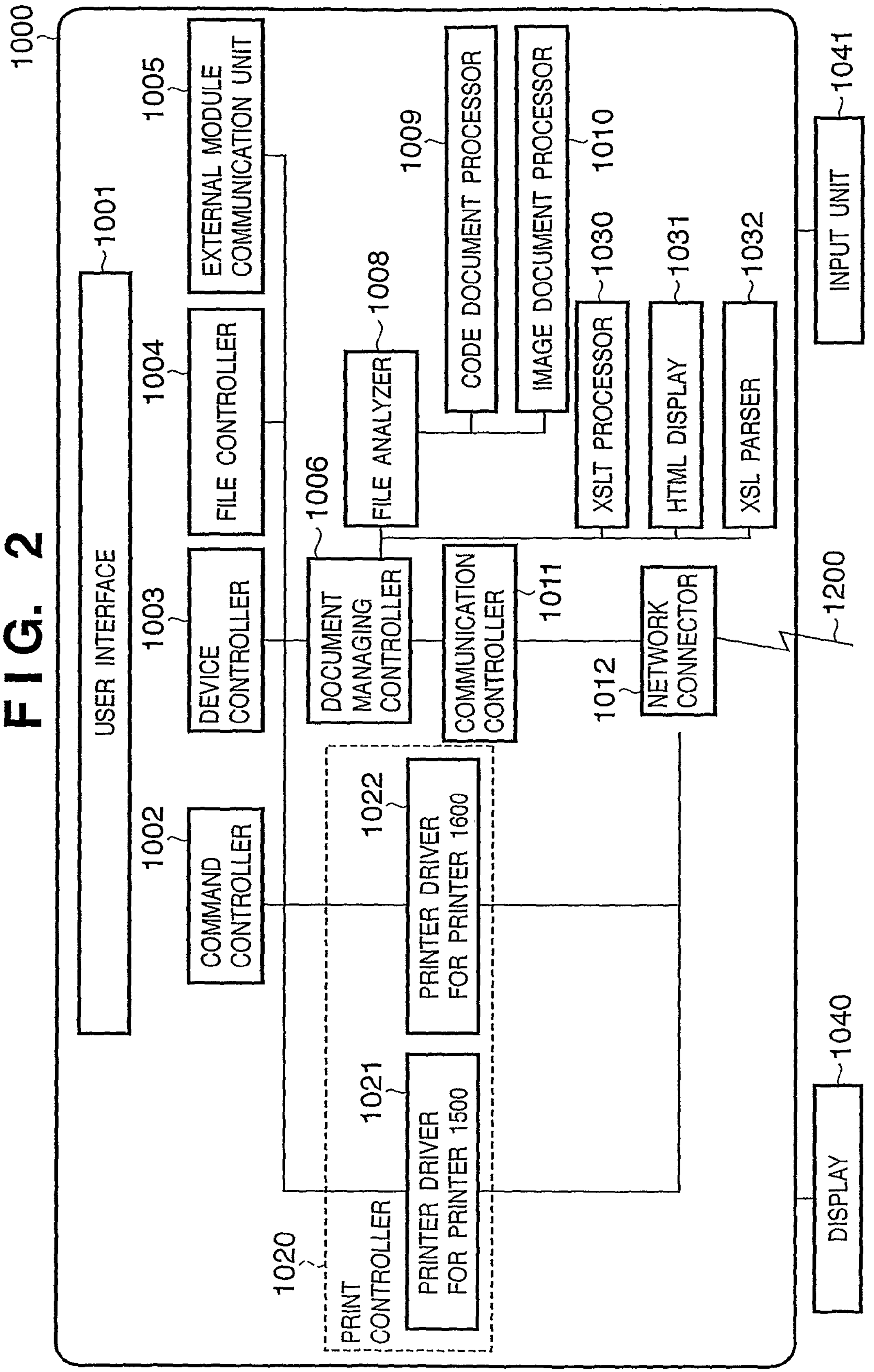
FIG. 2 is a diagram showing the functional configuration of a client in the document managing system according to the embodiment.

The client 1000 will be described with reference to FIG. 2, which is a diagram showing the functional configuration of the client 1000 in the document managing system according to the embodiment. The client 1300 is identical in functional configuration to the client 1000. Therefore the description of the client 1300 is omitted.

<Document Input/Output Processing Unit>

A processing unit for inputting and outputting documents and performing operations on documents will first be described.

A user can perform an operation to register a document in the document managing server 1100 through a user interface 1001, an operation to obtain a document from the document managing server 1100 and an operation to search for a document. Information manipulated through the user interface 1001 is analyzed in a command controller 1002 to perform suitable processing. A command for performing communication with the document managing server 1100 is prepared by the command controller 1002, if necessary. A device controller 1003 controls a device such as a scanner connected to the client 1000 and inputs or receives a document input or read by the device. A document file saved by an operating system (OS) of the document server 1100 is input and processed in a document import form by a file controller 1004. The file controller 1004 also exports a file managed by the document managing server 1100 to the OS in the server 1100. An external module communication unit 1005 communicates with an external application and supplies a document from the document managing server 1100 to the external application and receives a document from the external application. For example, processing for supplying a document managed by the document managing server 1100 to a mailer in accordance with the messaging application program interface (MAPI) is performed in the external module communication unit 1005.

A print controller 1020 has printer drivers 1021 and 1022 which manage information dependent on the models of the printers 1500 and 1600. Each of these printer drivers 1021 and 1022 generates print data in accordance with the functions of the corresponding printer on the basis of image information about a document selected by the document managing system and a printing environment setting. The print data thus generated is stored in a printer spooler (not shown) which is a data storage means and is sent to the printer 1500 (1600) via a network connector 1012. Needless to say, the print data referred to here comprises a group of commands in a case where the printer can interpret a printer language (PDL), image data in a case where only image processing is performed on the printer, and all data corresponding to the functions and abilities of the printer. Printer drivers are prepared in correspondence with all printer models for the purpose of managing information dependent on the models. In this embodiment, the printer driver 1021 for the printer 1500 and the printer driver 1022 for the printer 1600 are prepared in the print controller 1020.

<Internal Processing Units of Client System>

Processing units provided in the client 1000 will next be described.

A document managing controller 1006 is a main unit of the client. The document managing controller 1006 performs processing according to a document, an image or a command delivered from an input/output processing unit including the device controller 1003. A file analyzer 1008 determines whether or not a registered document is a document which can be treated as an image. If the document is able to be treated as an image, image processing is performed as desired on the document by an image document processor 1010. If the document is a code document (a text constituted by character codes) being not treated as an image, processing is performed on the document by a code document processor 1009. There are few chances of code document processing in the document managing server 1100. However, processing for making thumbnails for a code document and acquisition of document attributes for example are performed in the code document processor 1009. A forming of a preview image is also performed by the image document processor 1010.

A communication controller 1011 performs control for communication with the document managing server 1100. The communication controller 1011 in this embodiment performs only control specialized for processing in the document managing server 1100. For control of essential communication by TCP/IP or the like, the network connector 1012 is used. An extensible style language transformations (XSLT) processor 1030 is an application for changing extensible markup language (XML) data into an XML document in another form on the basis of an XSLT style sheet. A hypertext markup language (HTML) display 1031 is an application for displaying HTML data through the user interface 1001 of the client. An XSL parser and document object model (DOM) application (hereinafter referred to simply as "XSL parser") 1032 is an application for performing node search, addition and modification by expanding XML data and an XSLT style sheet in a DOM tree in a memory.

An input unit 1041 including the display 1040, a keyboard and a mouse realizes the input/output functions of the above-described user interface 1001.

Figure 3:
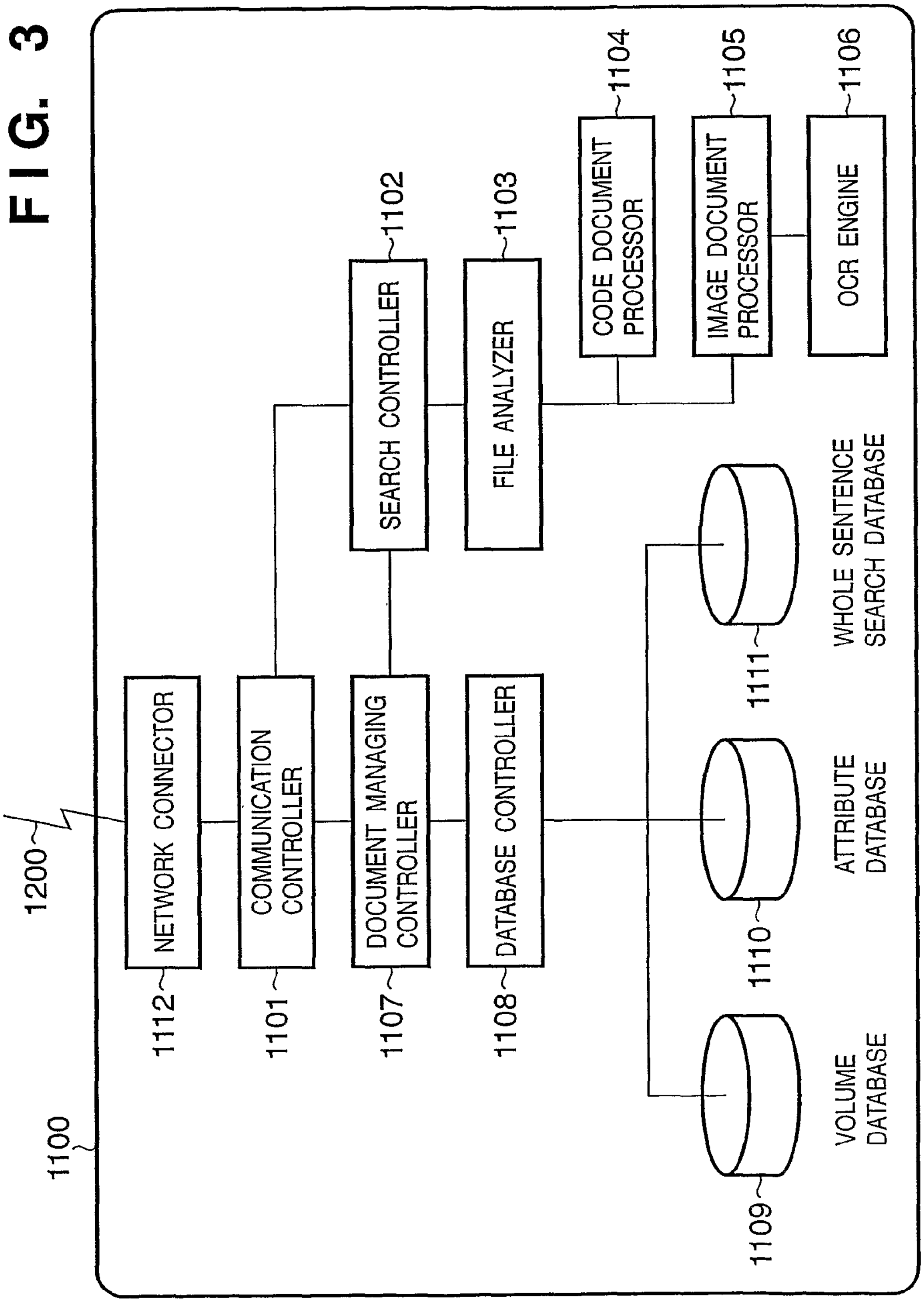
FIG. 3 is a diagram showing the functional configuration of a server in the document managing system according to the embodiment.

FIG. 3 is a diagram showing the functional configuration of the server 1100 in the document managing system according to this embodiment.

<Document Managing Server 1100>

Various processing units provided in the document managing server 1100 will be described.

A communication controller 1101 controls communication with the above-described communication controller 1011 of the client. The communication controller 1101 of the server is capable of simultaneously communicating with the communication controllers of a multiplicity of clients. The communication controller 1101 in this embodiment performs only control specialized for processing in the document managing server 1100. For control of essential communication by TCP/IP or the like, the network connector 1112 is used. A search controller 1102 performs processing for search for a document or the like requested by a client and processing for preparation of an index for search of registered documents. The main functions of a file analyzer 1103, a code document processor 1104 and an image document processor 1105 are the same as those of the components of the client 1000 described above with reference to FIG. 2. In the server 1100, however, processing for extracting a search index from document data according to registered document data is performed. That is, the file analyzer 1103 determines the kind of a registered file. If the registered file is a code document, index data is extracted by using the code document processor 1104. If the registered file is an image document, image processing is performed by the image document processor 1105 and index data is extracted by using an optical character reader (OCR) engine 106. A document managing controller 1107 allocates the entire processing relating to document management among the components.

A database processing unit in the server 1100 will next be described. A database controller 1108 prepares data to be stored in databases 1109 to 1111 and stores corresponding document data in a volume database 1109, an attribute database 1110 and a whole sentence search database 1111. The database controller 1108 also retrieves data from each database according to a request from a client and prepares document data to be delivered to the client. The volume database 1109 stores the essential contents of image documents and code documents. The attribute database 1110 stores information about documents relating to attributes, such as document names, document preparation dates and comments, and folder information, such as folder names, folder preparation dates and additional information. The attribute database 1110 also stores various sorts of setting data, such as information on users using the document managing system according to this embodiment, and XML data for display of a print setting window. The whole sentence search database 1111 stores data prepared as index data by extracting text data from registered document data. When a whole sentence search is made by a client, the whole sentence search database 1111 is searched.

<Printer>

Figure 4:
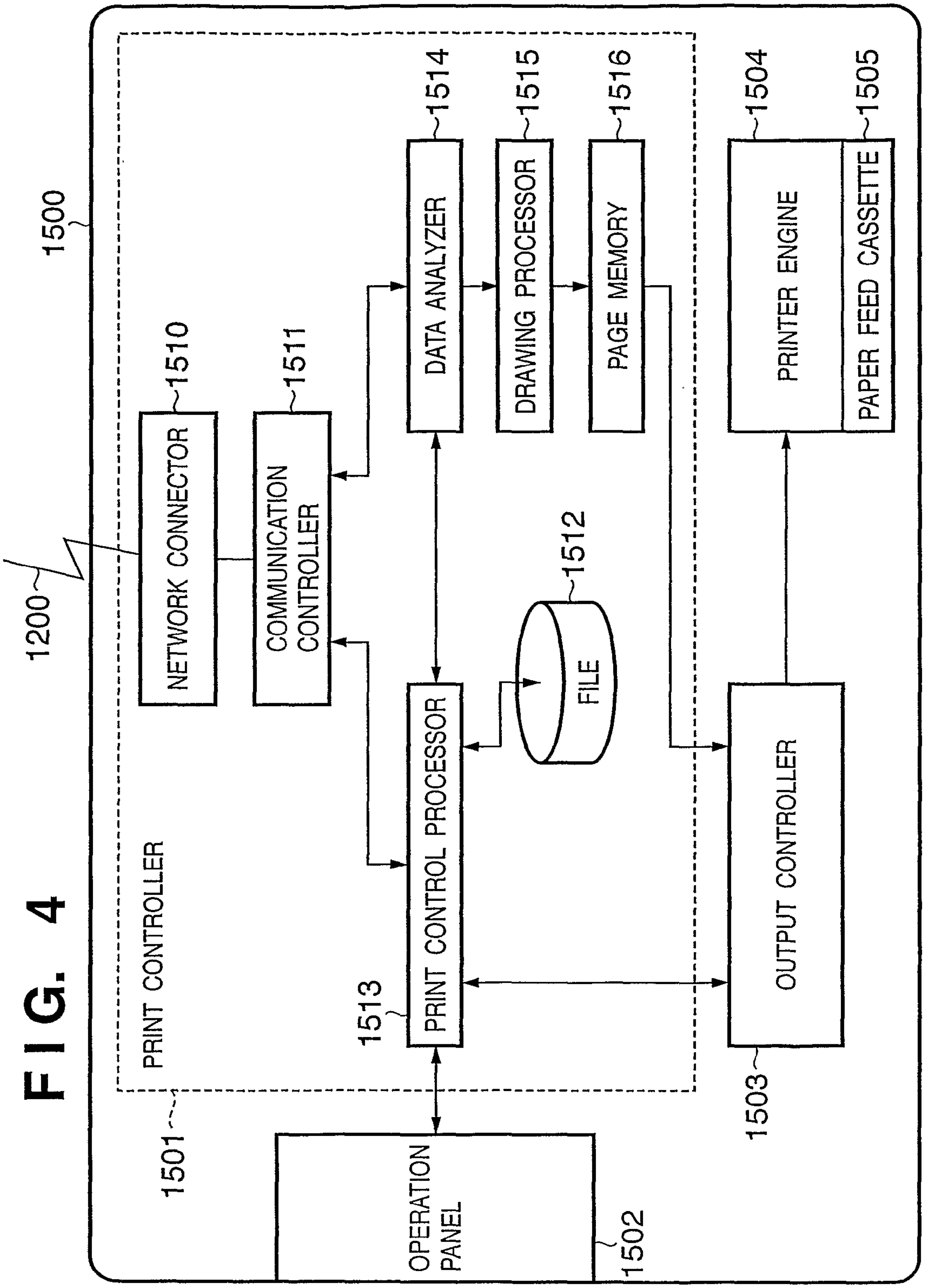
FIG. 4 is a diagram showing the functional configuration of a printer according to the embodiment.

FIG. 4 is a diagram showing the functional configuration of the printer 1500 according to this embodiment. The printer 1600 is identical in configuration to the printer 1500. Therefore the description of the printer 1600 is omitted.

The printer 1500 is roughly divided functionally into a print controller 1501, an operation panel 1502, an output controller 1503 and a printer engine 1504. The printer 1500 has a paper feed cassette 1505 in which recording sheets used for printing are accommodated.

The print controller 1501 has a network connector 1510 being a means for communication between the server 1100 and the client 1000, a communication controller 1511 for controlling communication processing, a file system 1512 being a storage means for storing various sorts of data when control of printing is executed, a print control processor 1513, a data analyzer 1514 for analyzing print data, a drawing processor 1515, and a page memory 1516.

The communication controller 1511 functions as a communication control means for receiving print data from the server 1100 and the client 1000 and notifying the server 1100 and the client 1000 of the state of the printer. The communication controller 1511 in this embodiment performs only control specialized for processing in the document managing server 1100. For control of essential communication by TCP/IP or the like, the network connector 1510 is used. Print data received by the communication controller 1511 via the network connector 1510 is analyzed by the data analyzer 1514. The data analyzer 1514 is constituted by control programs in accordance with print control commands. A command analyzed by the data analyzer 1514 is converted into an intermediate code in a unified form such that the results of analysis of print data relating to drawing can be more easily processed by the drawing processor 1515. Commands other than drawing commands, e.g., a paper feed command and a form registration command are processed by the print control processor 1513. The drawing (raster) processor 1515 executes each drawing command by the intermediate code generated by the data analyzer 1514 and develops in the page memory 1516 each of character, figure and image objects. Ordinarily, the print controller 1501 is constituted by a computer system using a central processing unit (CPU), a read-only memory (ROM) and a random access memory (RAM).

A stamp function of overwriting a stamp image on an original image to be printed is known as a printer function. When this stamp function is performed, the print control processor 1503 sends stamp image data of the file system 1512 to the drawing processor 1515. Receiving the stamp image, the drawing processor 1515 overwrites the stamp image on the original image. Processes in the components may be performed in a time sharing manner under a multitask monitor (real time OS), or pieces of special-purpose controller hardware may be provided in correspondence with the functions to independently perform the processes.

Figure 5:
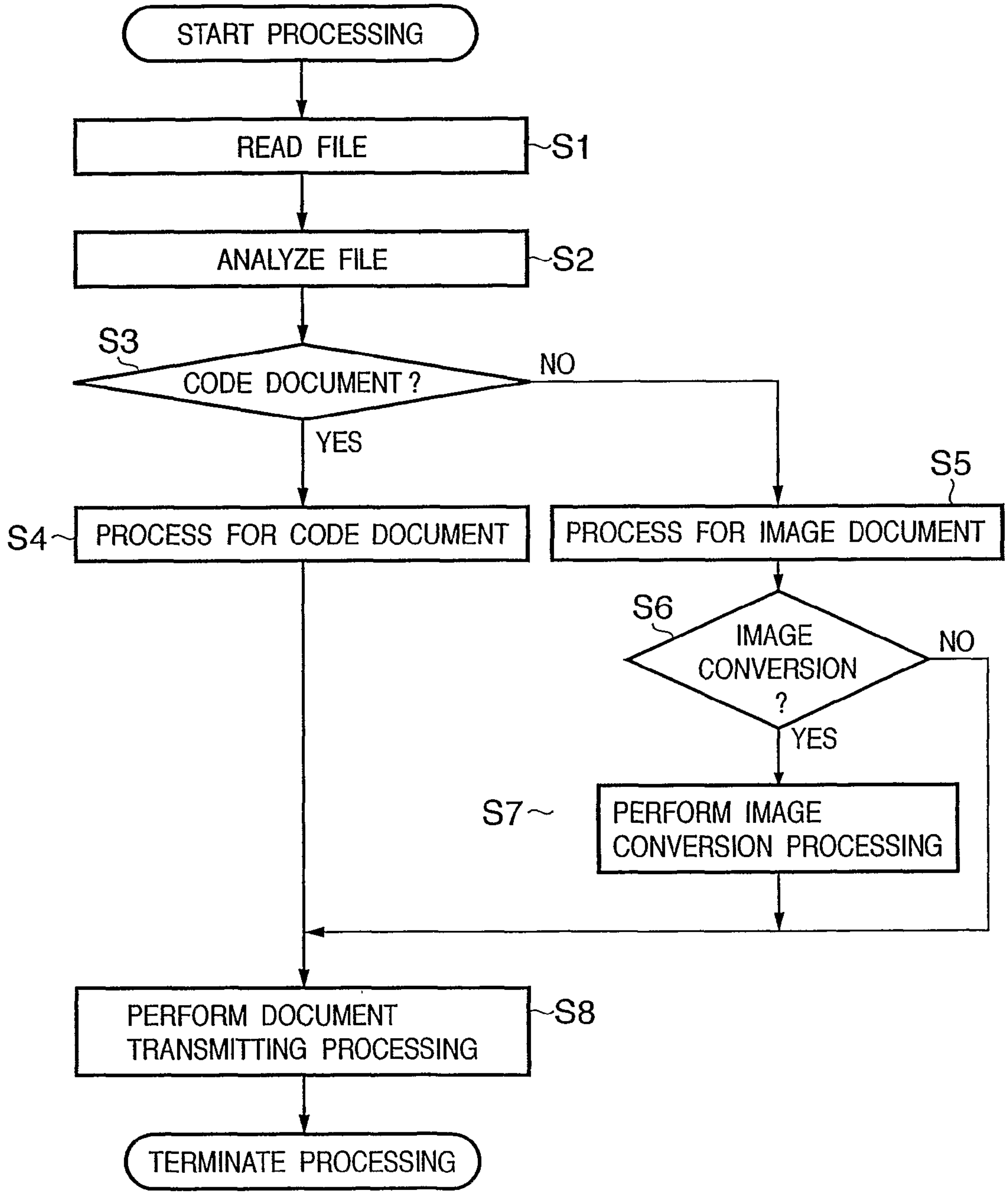
FIG. 5 is a flowchart for explaining document registration processing implemented by a client in the document managing system according to the embodiment.

FIG. 5 is a flowchart for explaining document registration processing performed by the client 1000 (1300) in the document managing system according to this embodiment.

In step S1, an application is executed in the client 1000 to read a file. In this processing, a file existing under the management by the OS, an image from the scanner or document data from an external application is taken in to the document management application by using the device controller 1003, the file controller 1004 or the external module controller 1005. In step S2, the document file read in step S1 is analyzed. This analysis is performed by the file analyzer 1008. That is, it is determined whether or not the document data can be manipulated in the document managing system and processing for obtaining information on attributes of the document file is performed. In step S3, it is determined whether the document analyzed in step S2 is an image document or a code document. This determination is also made by the file analyzer 1008.

At the time of registration of a document from the client to the document managing server 1100, there is a need to simultaneously register a thumbnail to be displayed to enable the document to be confirmed by the client. In the document managing system in this embodiment, the client prepares the thumbnail images. Therefore there is a need to analyze the contents of the document file and the module for processing the document file is changed.

If it is determined in step S3 that the analyzed document is a code document, the flow advances to step S4 and code document processing is performed. This code document processing is performed by the code document processor 1009. In this processing, a thumbnail to be displayed is prepared and attribute information stored as codes of the code document is taken out. If it is determined in step S3 that the analyzed document is an image document such as a pdf file, the flow advances to step S5 and processing of the image document is performed. This processing is performed by the image document processor 1010. This processing includes processing for preparing a thumbnail of the image document. The flow then advances to step S6 and it is determined whether or not the image document to be registered is stored after an image conversion. If so, the flow advances to step S7, an image conversion of the image document is made. After processing in step S4, S6 or S7, the flow advances to step S8 and the thumbnail and the document data are transmitted to the server 1100 via the network connector 1012 by the communication controller 1011. In this embodiment, it is assumed that TCP/IP is used as a communication protocol and basic processing relating to TCP/IP is performed by the network connector 1012. Document registration processing in the client is thus performed.

Figure 6:
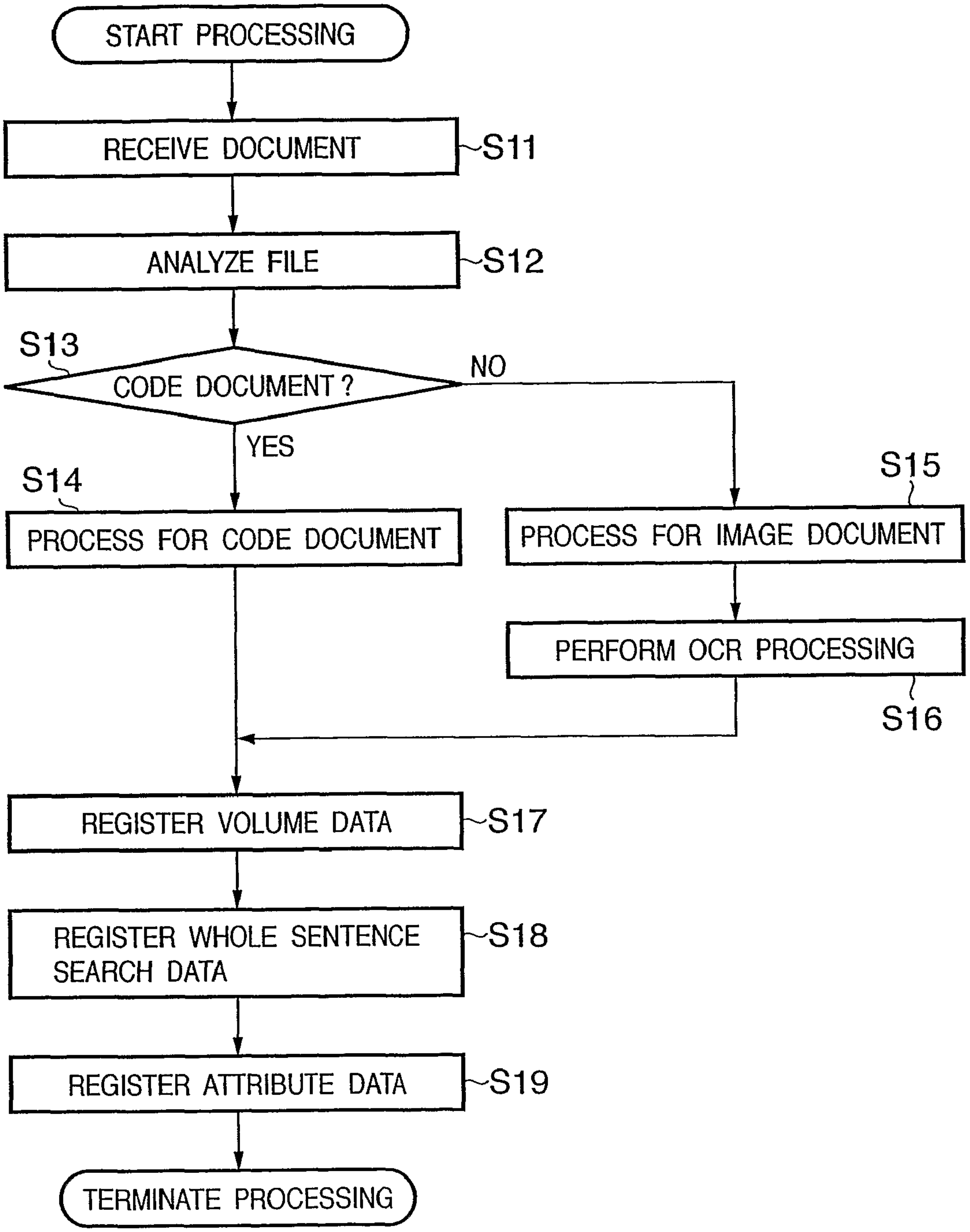
FIG. 6 is a flowchart for explaining document registration processing implemented by a document managing server in the document managing system according to the embodiment.

FIG. 6 is a flowchart for explaining a process of registering a document implemented by the document managing server 1100 in the document managing system according to this embodiment.

In step S11, processing shown in the flowchart of FIG. 5 is executed to receive data transmitted from the client 1000. This reception processing is performed by the communication controller 1101 via the network connector 1112. In processing in the document managing server 1100 as well as in processing in the client, basic processing relating to TCP/IP is performed by the network connector 1112. In step S12, the received file is analyzed. This analysis is performed by the file analyzer 1103 on the basis of an instruction from the search controller 1102. In step S13, it is determined whether the analyzed document is an image document or a code document. This determination is also performed by the file analyzer 1103. The contents of the document file is analyzed at the time of registration of the document because there is a need to extract index data for document search from the document in order to enable search for the registered document after the document has been registered in the document managing server 1100. According to the result of this analysis, the module for processing the document file is changed.

If it is determined in step S13 that the analyzed document is a code document, the flow advances to step S14 and process of the code document is performed. This processing is performed by the code document processor 1104. In this processing, the index data for search is extracted from the code document. If it is determined in step S13 that the analyzed document is an image document, the flow advances to step S15 and processing of image document is performed. This processing is performed by the image document processor 1105 and the image document is converted to obtain an image suitable for the OCR. The image document received from the client is actually registered in the database as it is. In step S16, the OCR processing is performed on the image converted in step S15 to extract the index data for search.

After execution of step S14 or S16, the flow advances to step S17 and the document received from the client is stored in the volume database 1109. The data stored in the volume database 1109 is the received document and thumbnail data for the document. In step S18, the index data extracted from the document is registered in the whole sentence search database 1111. In step S19, attribute data on the document, the ID of the document registered in the volume database 1109 and the ID of the index data registered in the whole search sentence database 1111 are registered in the attribute database 1110. The groups of data registered in the attribute database 1110, the volume database 1109 and the whole sentence search database 1111 are thereby associated with each other. Document registration processing in the server 1100 is thus performed.

Figure 7:
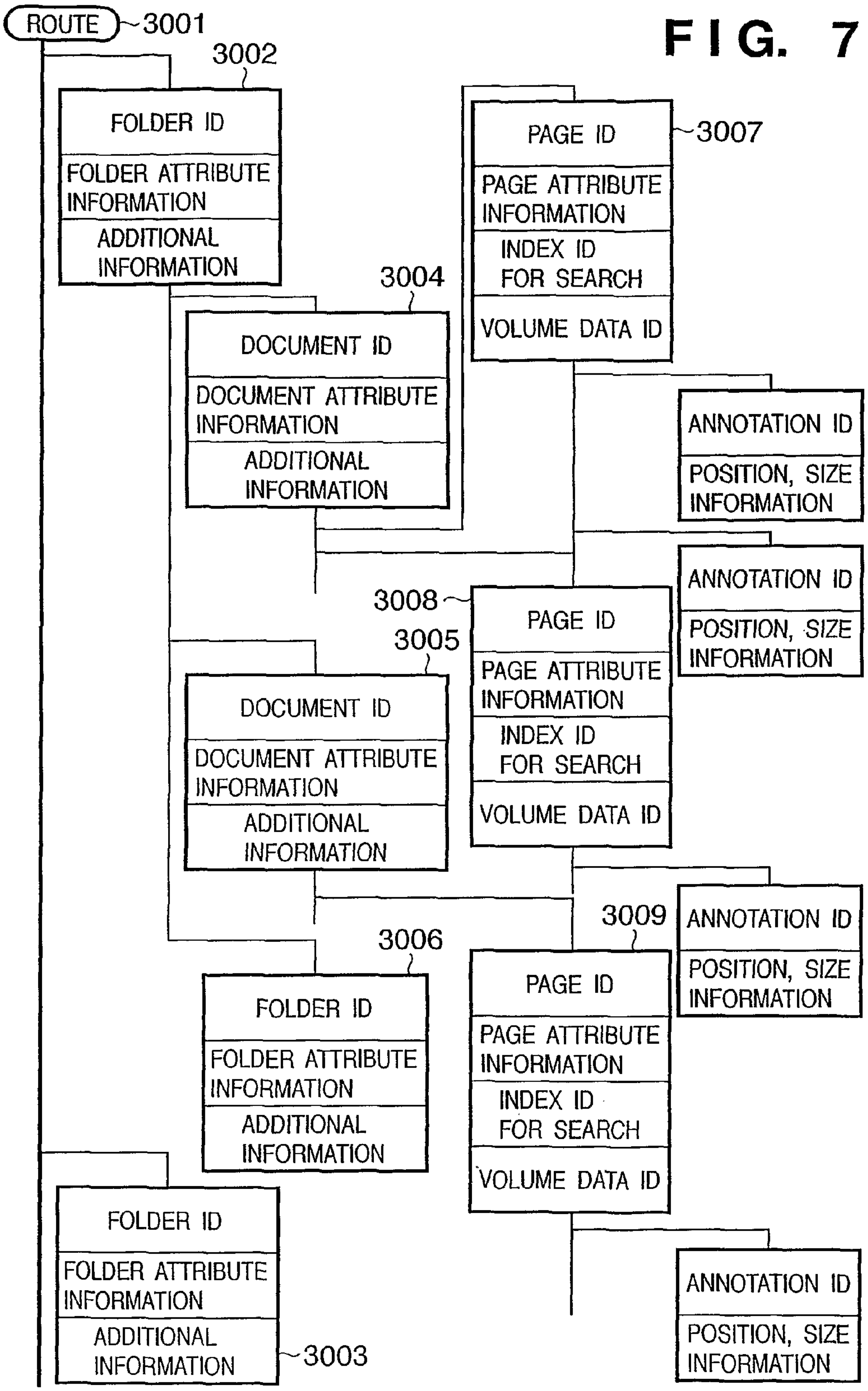
FIG. 7 is a diagram showing the structure of data registered in an attribute database of the server according to the embodiment.

FIG. 7 is a diagram showing the structure of data registered in the attribute database 1110 of the document managing server 1100 according to the embodiment. While the data structure is shown as a tree structure in FIG. 7, it is not necessarily required that the data in the database have a tree structure.

Reference numeral 3001 denotes a route in the attribute database 1110, and all registered data is child data below the route. Reference numeral 3002 denotes folder data provided as data on a folder in which data is stored by a user. This folder data 3002 includes a folder ID, folder attribute information and folder additional information. A plurality of folders can exist and each of a number of folders existing in the uppermost hierarchical level is registered as child data connected immediately below the route 3001, as indicated at 3003.

Reference numeral 3004 denotes document data existing as a child data below the folder 3002. The document data 3004 includes a document ID, document attribute information and document additional information. The document attribute information includes data such as a document name, an updating date and a comment. A plurality of groups of document data 3004 can also exist below folders and groups of document data, represented by such as document data 3005, can be registered in correspondence with a number of documents. Other folders may be provided subordinate to the above-described folders to form a folder hierarchical structure. Such folders, represented by such as a folder 3006, can be registered.

Reference numeral 3007 denotes page data and stores information on each page of a document identified by the document data 3004. The page data 3007 includes a page ID, page attribute information, a search index ID and a volume data ID. The search index ID represents an ID for information stored in the whole sentence search database 1111. The volume data ID is an ID registered in the volume database 1109. On the basis of each ID, information about the page can be extracted from the corresponding database. As page attribute information, information including a page number and a file format of the page is stored. Groups of page data 3007 exist in correspondence with the number of pages of the document and each of such groups of page data 3007 can be registered, as indicated at 3008. A code document cannot be stored by being segmenting on a page-by-page basis and is, therefore, treated as a document having only one page. Only one item of page data exists in page data for such a code document. Each page data 3009 stores information about a page of a document identified from the document data 3005 and includes an annotation ID and information about the position and size of the annotation.

Figure 8:
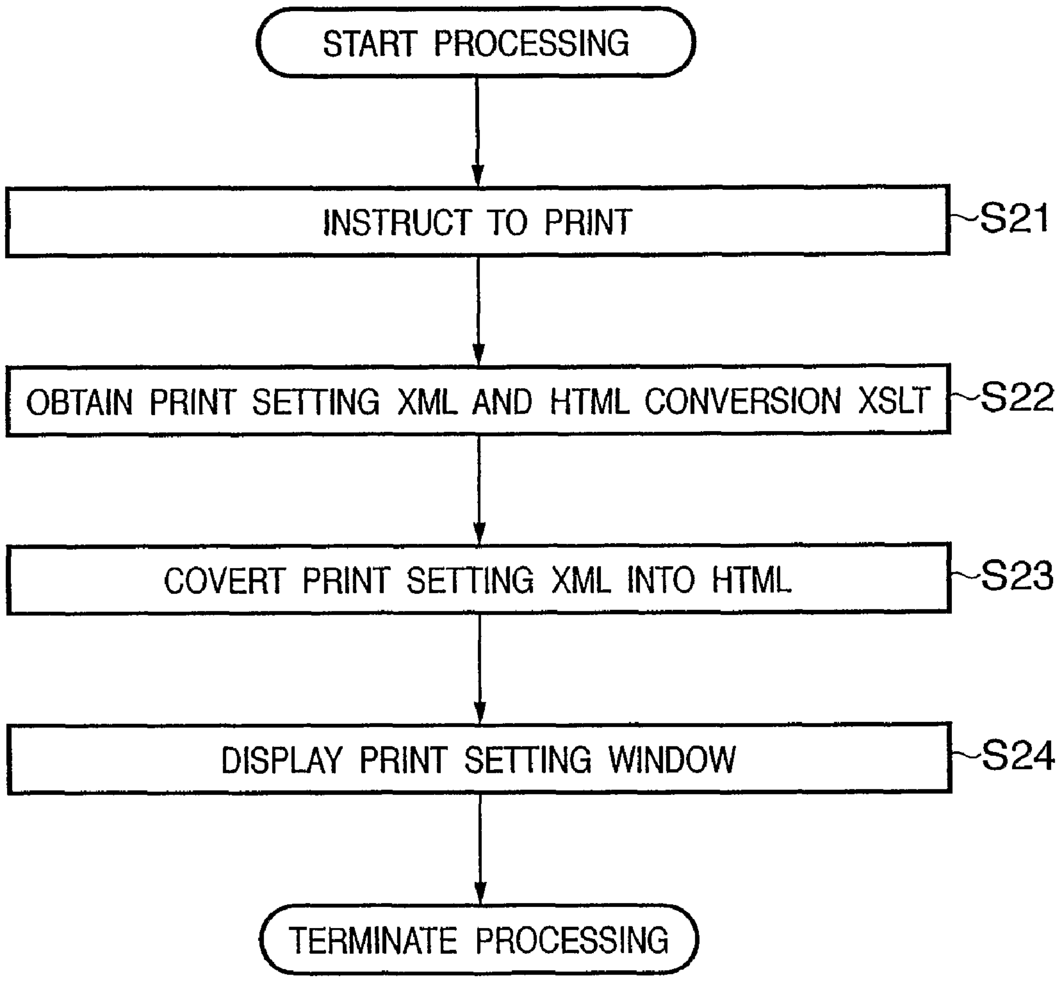
FIG. 8 is a flowchart for explaining processing of displaying a print settings window from print setting XML data in the document managing system according to the embodiment.

FIG. 8 is a flowchart for explaining processing for displaying a print settings window for a document on the display 1040 in the document managing system according to this embodiment, in a case where the client 100 designate a document and instructs to print the document. Description will be made of a case where print setting XML data 800 shown in FIG. 9 is obtained from the server 1100 and a print settings window 803 is displayed on the display 1040.

In step S21, the user of the client 1000 selects a document and instructs to the document by using the input unit 1041 of the user interface 1001. In step S22, the document managing controller 1006 receives this printing instruction and requests XML data 800 for the print settings window and HTML-conversion XSLT style sheet 801 for the server 1100 through the communication controller 1011 (Description will be made below of this with reference to FIG. 9.). The document managing controller 1107 in the server 1100 receives the request and sends XML data 800 and HTML-conversion XSLT style sheet 801 for the print settings window of the attribute data base 1110 to the client 1000 through the communication controller 1101. In step S23, the document managing controller 1006 of the client 1000 prepares HTML data 802 (FIG. 9) for the print settings window by using the XSLT processor 1030, on the basis of XML data 800 and HTML-conversion XSLT style sheet 801 for the print settings window received from the server 1100. In step S24, the document managing controller 1006 of the client 1000 displays, on the display 1040 of the user interface 1001, by using the HTML display 1031, the data for display of the print settings window 803 prepared on the basis of the HTML data 802 for the print setting window.

<Display of Print Setting Window>

Processing for display of the print settings window will be described.

Figure 9A:
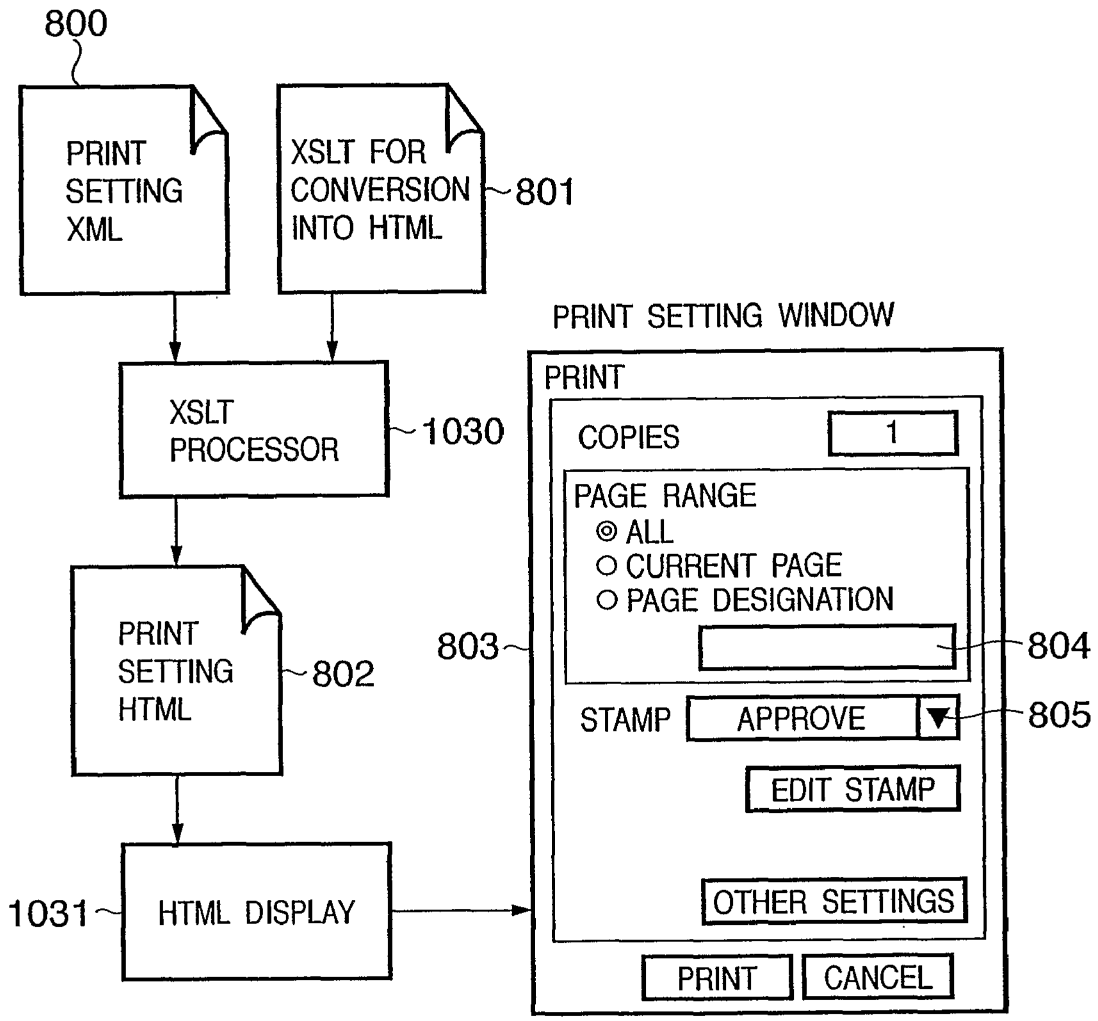

FIGS. 9A and 9B are diagrams for explaining processing for display of the print settings window in the client 1000 according to the embodiment. FIG. 9A shows the concept of processing for display of the print settings window based on the print setting XML data 800. FIG. 9B shows an example of description of the print setting XML data 800.

Reference numeral 800 denotes XML data describing the print setting window. In the XML data 800, setting item information for the print settings window is described in XML form. Reference numeral 801 denotes an XSLT style sheet for converting the XML data 800 into an HTML form. The XML data 800 and XSLT style sheet 801 for the print settings window are stored in the attribute database 1110 of the server 1100. HTML data 802 is prepared by converting the XML data 800 into HTML by the XSLT processor 1030 of the client 1000 on the basis of information on XSLT style sheet 801 and describes the print setting window. The HTML data 802 for the print settings window is changed into a display form for the client 1000 by the HTML display 1031 so that the HTML data 802 is displayed as print settings window 803 on the display 1040 of the user interface 1001.

FIG. 9B shows an example of description of the XML data 800 for the print settings window supplied from the server 1100.

Reference numeral 810 denotes an XML declaration portion for declaring that the data is an XML document. Reference numeral 814 denotes an XML instance portion, which is an actual data portion. An ordinary XML document has a document type declaration portion for defining a tag structure for the XML document. In the description of this embodiment, the illustration of such a portion is omitted.

In the example of the XML data 800 for the print settings window shown in FIG. 9A, three setting items: "print copies", "page range" and "stamp" exist in the XML instance portion 814, and settings of these items are respectively described in areas 811, 812, and 813. In area 811, a name ("print copies") for "Print Copies" is described in a <title tag>; a kind of setting ("edit box" in this example) in a <class> tag; an initial value ("1" in this example) in a <value> tag; and a display size ("small" in this example) in a <size> tag.

Similarly, in area 812, with respect to "Print Range", a name ("print range") is described in a <title tag>; a kind of setting ("radio button") in a <class> tag; an initial value ("all") in a <value> tag; and a display size ("small") in a <size> tag. Since a radio button is set as a kind of setting in the <class> tag in this example, radio button selection items ("all", "current page" and "page designation") are described in <radioitem> tags.

Items with radio buttons "All", "Current Page" and "Page Designation" are thereby displayed in "Page Range" and the radio button "All" is checked according to the initial value, as shown in the example of the window 803 shown in FIG. 9A.

An edit box is placed for the item "page designation" in the radio button selection items, "edit box" is described in a <subclass> tag as a child node subordinate to the <radioitem> tag in which "page designation" is described.

This description corresponds to an edit box 804 in the window 803 shown in FIG. 9A.

Similarly, in area 813, a name ("stamp") for "Stamp" is described in a <title tag>; a kind of setting ("dropdown") in a <class> tag; an initial value ("approved") in a <value> tag; and a display size ("small) in a <size> tag. Since a dropdown listbox is set as a kind of setting in the <class> tag in this example, dropdown listbox selection items ("none", "approve" and "reject") are described in <listitem> tags.

Accordingly, if a button 805 in the window 803 shown in FIG. 9A is clicked, the selection items ("none", "approve" and "reject") are displayed as a dropdown (pulldown) menu.

<Registration of Layout Information for Print Settings Window 803>

Registration of layout information for changing the layout of the print settings window 803 will be described. The print settings window 803 may be set on a folder-by-folder basis.

Figure 10:
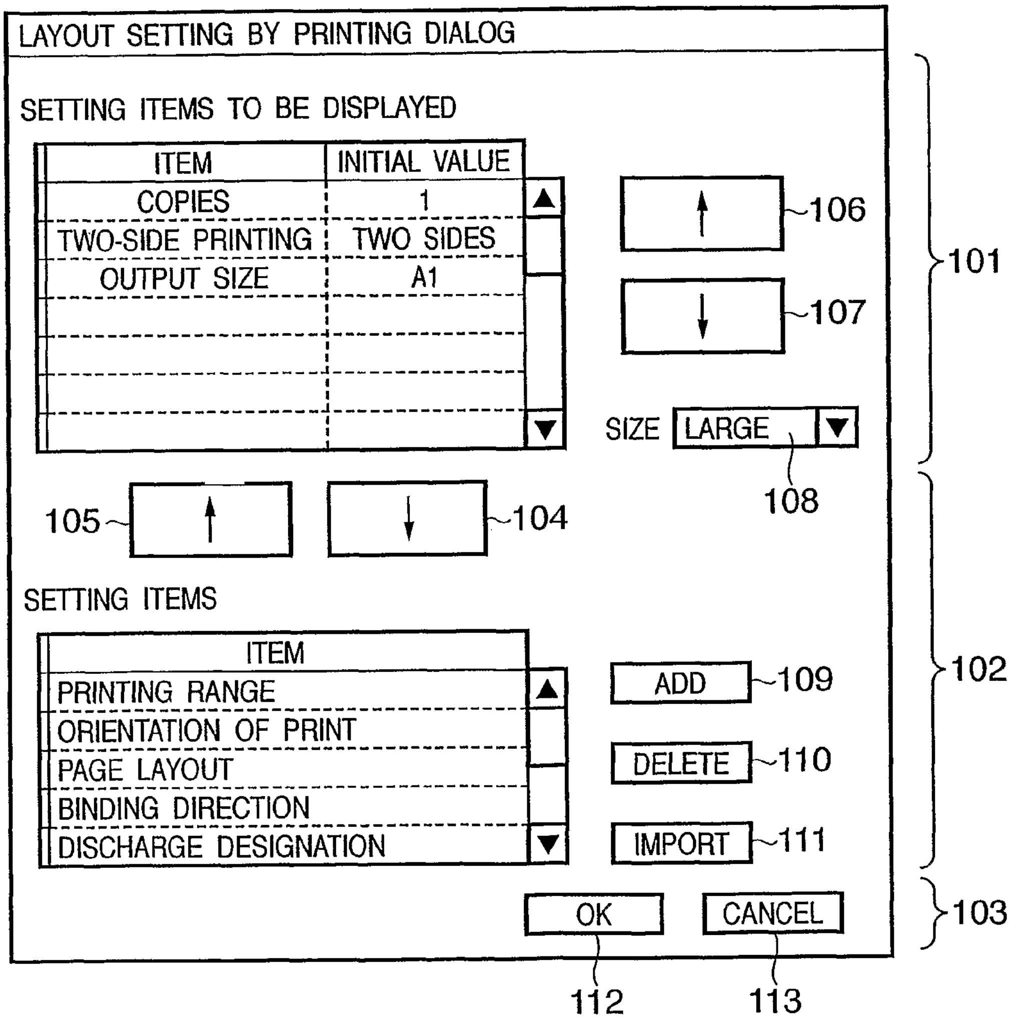
FIG. 10 depicts a view showing an example of a settings window for setting layout information for changing the layout of the print settings window for each folder.

FIG. 10 is a pictorial view of a settings window for setting layout information for changing the layout of the print setting window.

In FIG. 10, reference numeral 101 denotes a display area used for changing the layout of setting items displayed in the print setting window; reference numeral 102 denotes an area for selection of print setting items; and reference numeral 103 denotes an area for designating saving (OK) or cancellation (CANCEL) of setting results. Items "Copies", "Two-side Printing" and "Output Size" are displayed in the print settings window and the initial values of these items are "1", "two sides" and "A4", respectively.

If one of items in a "setting items to be displayed" list in display area 101 is selected and a "downward arrow" button 104 above a "setting items" list is pointed, the selected item is moved into the "setting items" list in area 102. Conversely, if one of items in the "setting items" list in the area 102 is selected and an "upward arrow" button 105 above the "setting items" list is pointed, the selected item is moved into the "Setting Items to be Displayed" list in area 101.

If "Initial Value" of an item displayed in the "Setting Items to be Displayed" list in the area 101 is selected, the initial value becomes editable and can be changed by inputting an arbitrary value as the initial value by means of a keyboard for example. If one of the items in the "Setting Items to be Displayed" list in display area 101 is selected and an "Upward Arrow" button 106 or a "Downward Arrow" button 107 on the right-hand side of the "Setting Items to be Displayed" list is pointed, the position of the selected item in the order of the items in the "Setting Items to be Displayed" list is changed. The display size of one of the items in the "Setting Items to be Displayed" list in display area 101 can be changed by selecting the item in the list and by changing the value in a "Size" dropdown listbox 108 on the right-hand side of the "Setting Items to be Displayed" list.

If an "Add" button 109 in the area 102 is pointed, a settings window (not shown) for newly adding a setting item is displayed to enable a setting item to be newly added. If one of the items in the "Setting Items" list in area 102 is selected and a "Delete" button 110 is clicked, the selected item is deleted. If an "import" button 111 is clicked to select a printer driver, a settings window (not shown) for adding setting items from the selected printer driver is displayed to enable setting items of the printer driver to be added.

Further, if an "OK" button 112 in area 103 is clicked after editing of the above-described setting items, an XSLT style sheet 801 reflecting the display order, initial values, and size information added or changed in the area 102 with respect to the items selected in the "Setting Items to be Displayed" list in area 101 is prepared and is stored as additional information for the selected folder. A "Cancel" button 113 may be used to terminate this processing without registering the details-set and changed by using the window.

Figure 11:
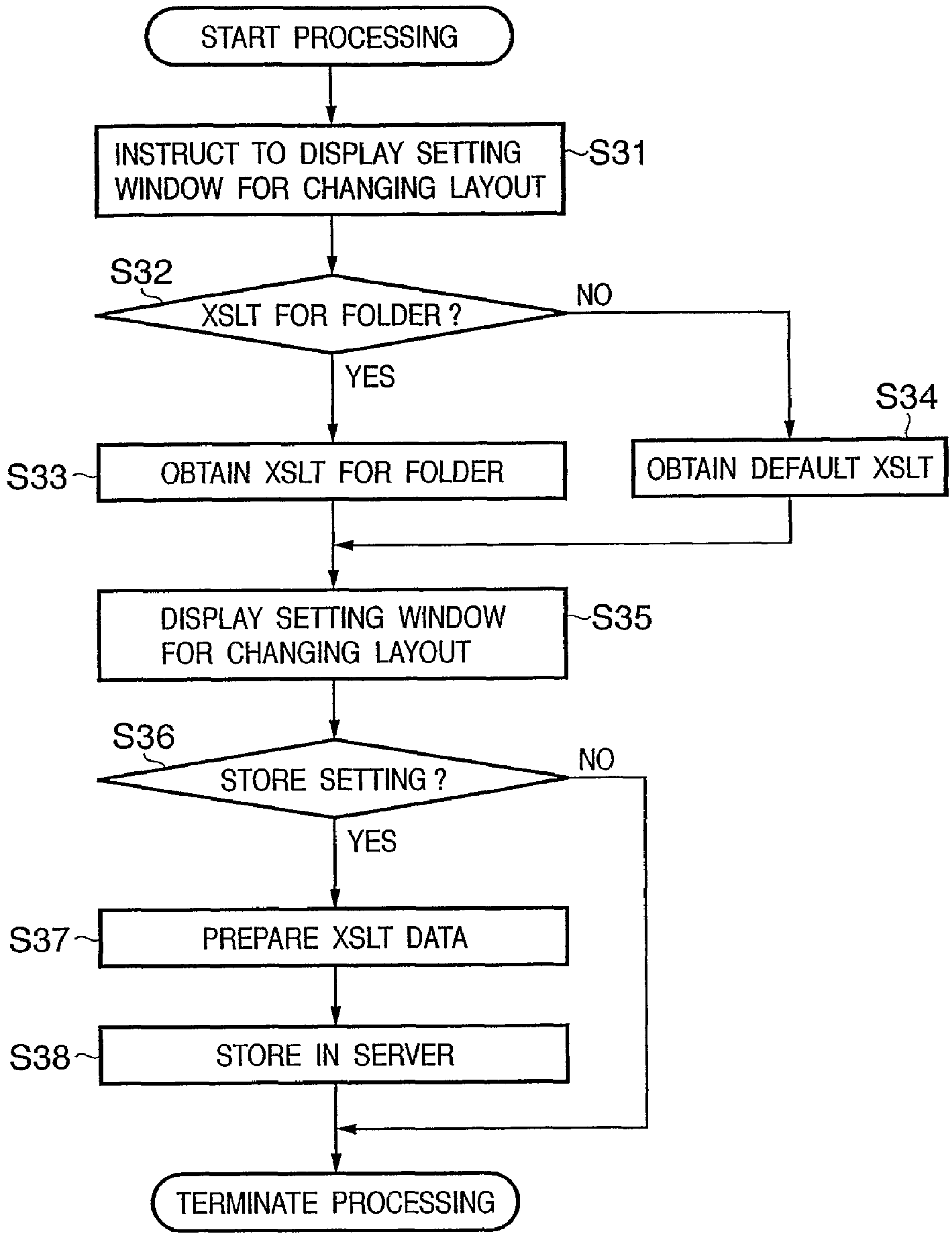
FIG. 11 is a flowchart for explaining processing for setting layout information for changing the layout of the print settings window for each folder in the document managing system according to the embodiment.

FIG. 11 is a flowchart for explaining processing for setting layout information for changing the layout of the folder print settings window in the client 1000 in the document managing system according to the embodiment.

In step S31, the user of the client 1000 selects a folder by using the input unit 1041 of the user interface 1001 and inputs an instruction to display the layout change window. The window shown in FIG. 10 is thereby displayed. In step S32, the document managing controller 1006 receives a printing instruction and requests the XSLT style sheet 801 for changing the layout of the print settings window for the selected folder for the server 1100 through the communication controller 1011. The document managing controller 1107 of the server 1100 receives the request and searches for additional information of the selected folder stored in the attribute database 1110. If there is any additional information of the selected folder, the document managing controller 1107 transmits the XSLT style sheet 801 for changing the layout of the print settings window corresponding to the folder to the client 1000 through the communication controller 1101. If there is no corresponding data, the document managing controller 1107 sends a default XSLT style sheet of the attribute database 1110 to the client 1000 through the communication controller 1101.

Thus, if the XSLT style sheet for changing the layout of the print settings window corresponding to the selected folder is sent from the server 1100 in step S32, the flow advances to step S33 and the style sheet is obtained. If no corresponding style sheet is stored in the server 1100, the default XSLT style sheet is received (step S34).

After execution of step S33 or S34, the flow advances to step S35 and the client 1000 receives the XSLT style sheet for changing the layout of the print setting window, and the document managing controller 1006 prepares the settings window (FIG. 10) for changing the layout of the print settings window and displays the settings window on the display 1040. The user can perform operations and make settings by using the displayed settings window (FIG. 10) to change the layout, as described above.

If the user clicks "OK" button 112 to input an instruction to store the changed layout information in step S36, the flow advances to step S37 and the document managing controller 1006 prepares the XSLT style sheet for changing the layout of the print setting window, in which the setting items in the settings window are reflected. In step S38, the document managing controller 1006 transmits the XSLT style sheet for changing the layout of the print settings window and a request for storing to the selected folder to the server 1100 through the communication controller 1011.

The document managing controller 1107 of the server 1100 receives the XSLT style sheet for changing the layout of the print settings window and the storage request, and stores, in the additional information for the selected folder in the attribute database 1110, the XSLT style sheet for changing the layout of the print setting window, received from the client 1000.

<Display of Print Settings Window which Layout has been Changes>

The operation of displaying the print settings window which layout has been changed will be described.

Figure 12A:
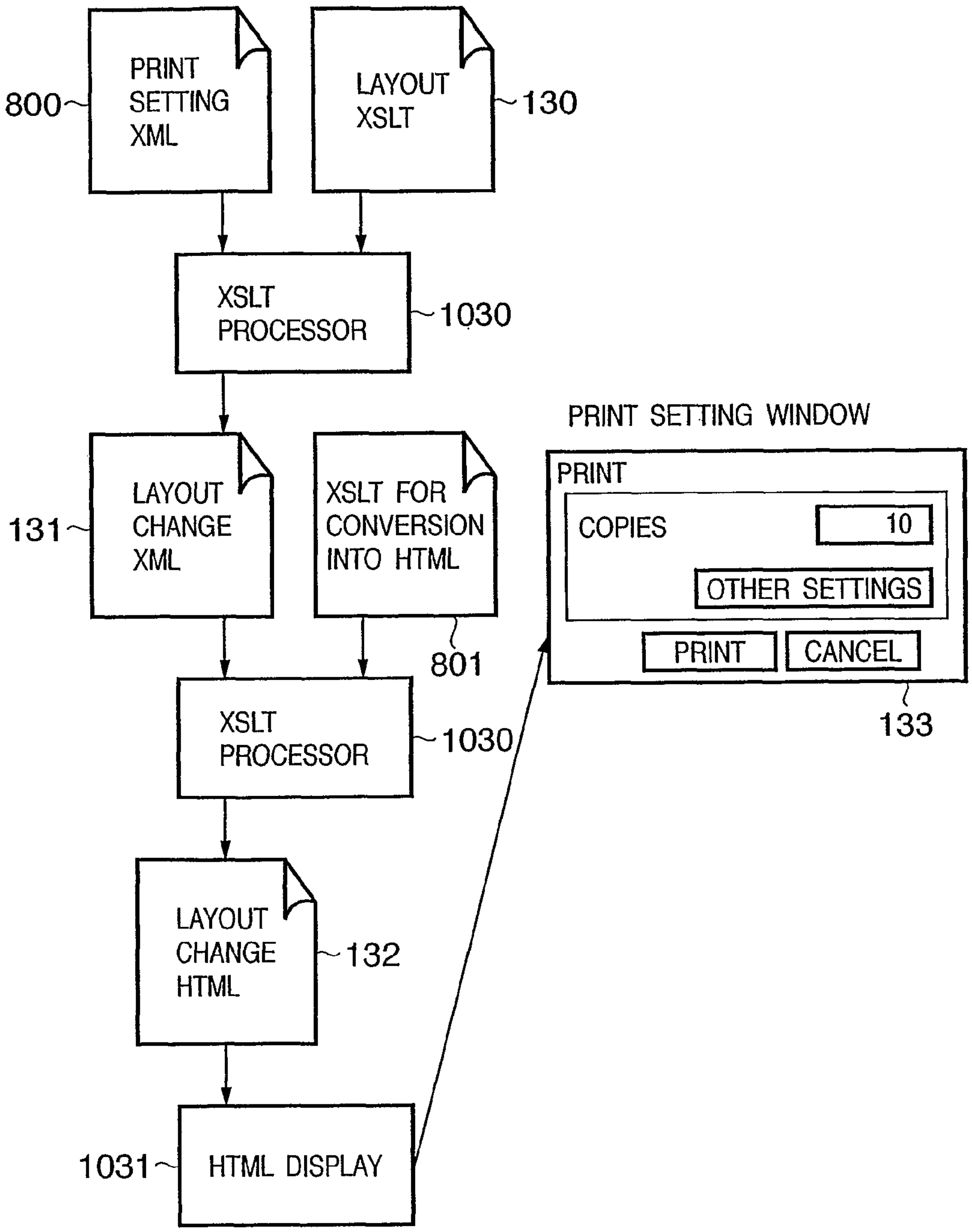
Figure 13:
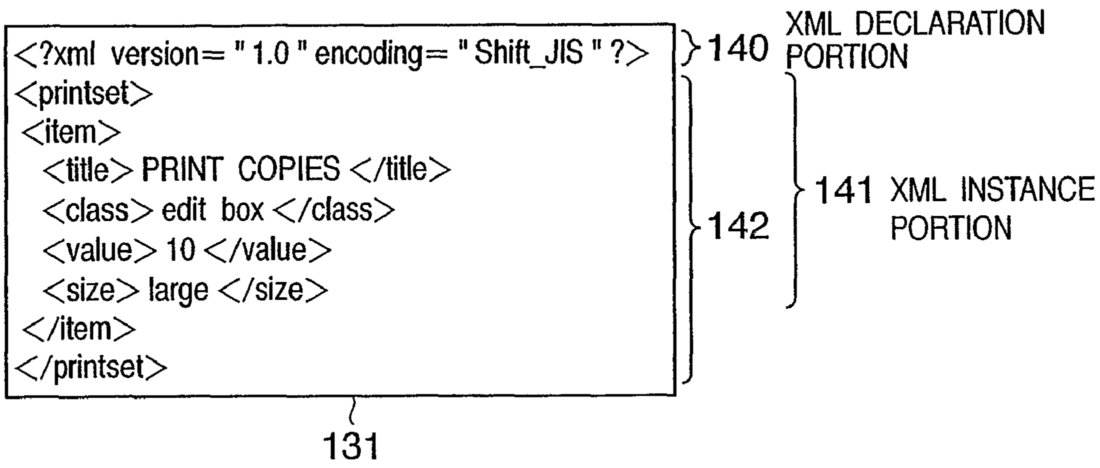
FIG. 13 is a diagram showing an example of description of XML data for a print settings window in which layout change information is reflected.

FIGS. 12A, 12B and 13 are diagrams for explaining changes in the print settings window in the client 1000 according to this embodiment. FIG. 12A shows processing for displaying the print settings window based on print setting XML data and an XSLT style sheet for changing the layout of the print settings window of a folder in the embodiment. FIG. 12B shows an example of description of an XSLT style sheet for changing the layout of the print setting window. FIG. 13 is a diagram showing an example of description of the print setting XML data in which a change of layout is reflected.

In the XML data 800 for the print setting window, information on setting items in the print settings window is described in an XML form. An XSLT style sheet 130 for changing the layout of the print settings window is an XSLT style sheet for converting the XML data 800 into HTML form. The XML data 800, the XSLT style sheet 130 and the XSLT style sheet 801 described below are stored in the attribute database 1110 of the server 1100.

Layout change XML data 131 is XML data which is prepared by making XML conversion of the XML data 800 on the basis of information in XSLT style sheet 130 by means of the XSLT processor 1030 of the client 1000, and in which layout change is reflected. HTML data 132 is HTML data for the print settings window prepared by making HTML conversion of the XML data 131 on the basis of the XSLT style sheet 801 by means of the XSLT processor 1030 of the client 1000. The HTML data 132 for the print settings window is changed into data in the display form in the client 1000 by the HTML display 1031 so as to be displayed as a print settings window 133 on the display 1040.

FIG. 12B is a diagram showing an example of description of the XSLT style sheet 130 for changing the layout of the print setting window. Since XSLT style sheet 130 is also described in XML form, it may be divided into an XML declaration portion 134 for declaring that the style sheet is an XML document, and an XML instance portion 135 which is an actual data portion. In ordinary XML documents, a document type declaration portion for defining a tag structure for the XML document exists. However, this declaration portion is omitted in the description of this embodiment.

In this example of XSLT style sheet 130 for changing the layout of the print setting window, the XML instance portion 135 includes an XSLT style sheet declaration portion 136 and areas 137 and 138 in which the actual style sheet is defined. In area 136, information on attributes of an <xsl:stylesheet> tag, including a style sheet version and a name space, is described. In the area 137, a definition for performing processing of the area 138 is described. More specifically, select="//item" is described as an attribute of an <xsl:apply-templates> tag such that processing described in the area 138 is performed on the route and all the child nodes of the XML data.

In the area 138, an <xsl:choose> tag and an <xsl:when> tag are described for changing processing by selecting elemental contents of an <item> tag. More specifically, test="title=print copies" is described as an attribute of the <xsl:when> tag and processing described in the <xsl:when> tag is performed if an elemental content of a <title> tag in the XML data is "print copies". For processing in the <xsl:when> tag, the <title> tag, a <class> tag, a <value> tag and a <size> tag are described in the <item> tag. The elemental content of the <title> tag is defined as <xsl:value-of select="."/>. Accordingly, the same value as that in the original XML data is used as this elemental content. Similarly, an essential content of the <class> tag is defined as <xsl:value-of select="class"/>. Accordingly, the same value as that in the original XML data is used as this elemental content. In this example, however, an essential content of the <value> tag is described as "10" and an essential content of the <size> tag is described as "large". Accordingly, the elemental content of the <value> tag in the original XML data is changed to "10" and the elemental content of the <size> tag in the original XML data is changed to "large".

FIG. 13 is a diagram showing an example of description of the XML data 131 for the print settings window in which layout change information is reflected.

This description is divided into an XML declaration portion 140 for declaring that the data is an XML document, and an XML instance portion 141 which is an actual data portion. In ordinary XML documents, a document type declaration portion for defining a tag structure of the XML document exists. However, this declaration portion is omitted in the description of this embodiment. In the example of the XML data 131 for the print settings window in which layout change information is reflected, only the setting items "print copies" exists in the XML instance portion 141 and the contents of setting are described in area 142. In the area 142, with respect to "print copies", a name is described in a <title> tag, a kind of setting in a <class> tag, an initial value in a <value> tag, and a display size in a <size> tag. As can be understood from comparison with the XML data 800 for the print settings window before changing the layout, the areas 812 and 813 shown in FIG. 91 are removed and, in the data shown in FIG. 13 with respect to the area 811, the elemental content of the <value> tag is changed to "10" and the elemental content of the <size> tag is changed to "large", while the descriptions in the "title" tag and the "class" tag are not changed.

Figure 14:
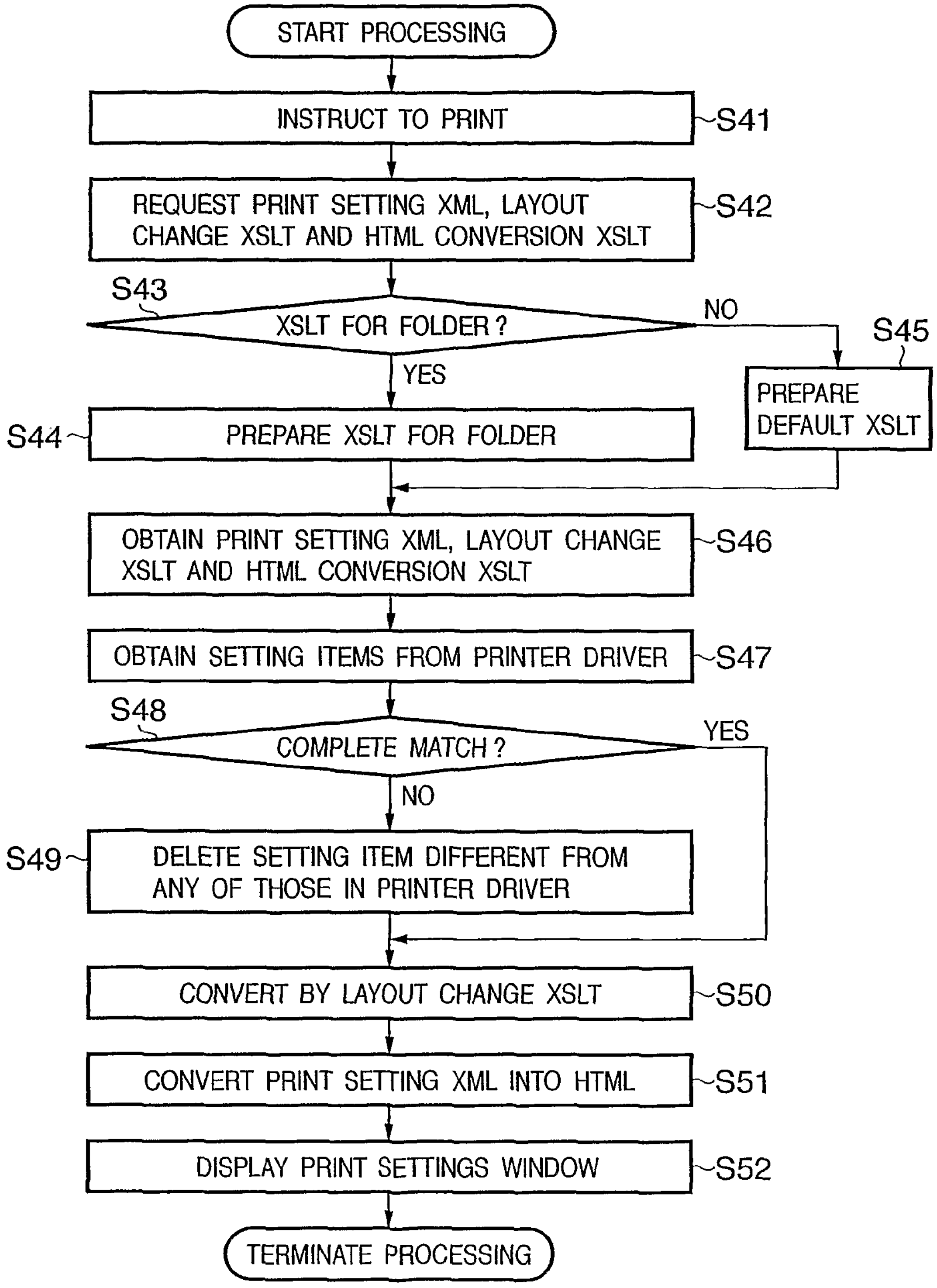
FIG. 14 is a flowchart showing processing for displaying a print settings window from print setting XML data and information on changes in layout of a print settings window for a folder by means of the client and the server in the document managing system according to the embodiment.

FIG. 14 is a flowchart showing processing for displaying the print settings window based on print setting XML data and information on changes in layout of the print settings window of a folder in the client and the server 1100 according to the embodiment.

In step S41, the user selects a document and instructs to print by using the input unit 1041 of the user interface 1001. In step S42, the document managing controller 1006 receives the print instruction and requests for the server 1100 the XML data 800 for the print setting window, HTML-conversion XSLT style sheet 801 and XSLT style sheet 130 for changing the layout of print settings window of the folder through the communication controller 1011.

In step S43, the document managing controller 1107 of the server 1100 receives the request and checks additional information of the selected folder in the attribute database 1110. If the XSLT style sheet 130 for changing the layout of the print settings window is stored in the selected folder, the flow advances to step S44 and the document managing controller 1107 obtains the style sheet. If the style sheet is not stored, the flow advances to step S45 and the document managing controller 1107 obtains the default XSLT style sheet in the attribute database 1110.

After execution of this step S44 or S45, the flow advances to step S46 and the document managing controller 1107 of the server 1100 receives the request and sends the XML data 800 for the print setting window, HTML-conversion XSLT style sheet 801 and XSLT style sheet 130 for changing the layout of print settings window in the attribute database 1110 to the client 1000 through the communication controller 1101. In step S47, the document managing controller 1006 of the client 1000 identifies a printer to be used, for example, from information in a memory managed by the OS of the client 1000, and obtains print setting items from the printer driver for the printer to be used. For example, if the printer 1500 has been selected by the client 1000, the document managing controller 1006 obtains print setting items from the printer driver 1021. If the printer 1600 has been selected, the document managing controller 1006 obtains print setting items from the printer driver 1022.

In step S48, the document managing controller 1006 of the client 1000 develops the XSLT style sheet 130 for changing the layout of the print settings window in a memory by using the XSL parser 1302, obtains the print setting items from the style sheet 130 and compares the obtained print setting items with the print setting items of the printer to be used. If there is a print setting item being different from any of the print setting items of the selected printer in the XSLT style sheet 130 for changing the layout of the print setting window, the flow advances to step S49 and the print setting item which does not exist in the print setting items of the selected printer is deleted from the XSLT style sheet 130 for changing the layout of the print setting window. The flow then advances to step S50. In the case where all print setting items match in step S48, the flow advances from step S48 to step S50.

In step S50, the document managing controller 1006 of the client 1000 prepares the XML data 131 for the print settings window by using the XSLT processor 1030 on the basis of the received XML data 800 for the print settings window and the received XSLT style sheet 801 for changing the layout of the print setting window. In step S51, the document managing controller 1006 of the client 1000 prepares the HTML data 132 for the print settings window by using the XSLT processor 1030 on the basis of the prepared XML data 131 for the print settings window and the XTML-conversion XSLT style sheet 801. In step S52, the document managing controller 1006 of the client 1000 prepares the print settings window 133 on the basis of the HTML data 132 for the print settings window and displays the prepared print settings window 133 on the display 1040 of the user interface 1001 by using the HTML display 1031.

According to this embodiment, as described above, a print settings window can be prepared and registered with respect to each of folders in which documents are registered. Also, the print settings window is read out to enable the print setting to be changed or a new item to be added to the print setting window. A setting items which have been changed or added can be registered by being associated with the document data.

EXAMPLES OF MODIFICATIONS OF EMBODIMENT

Figure 15:
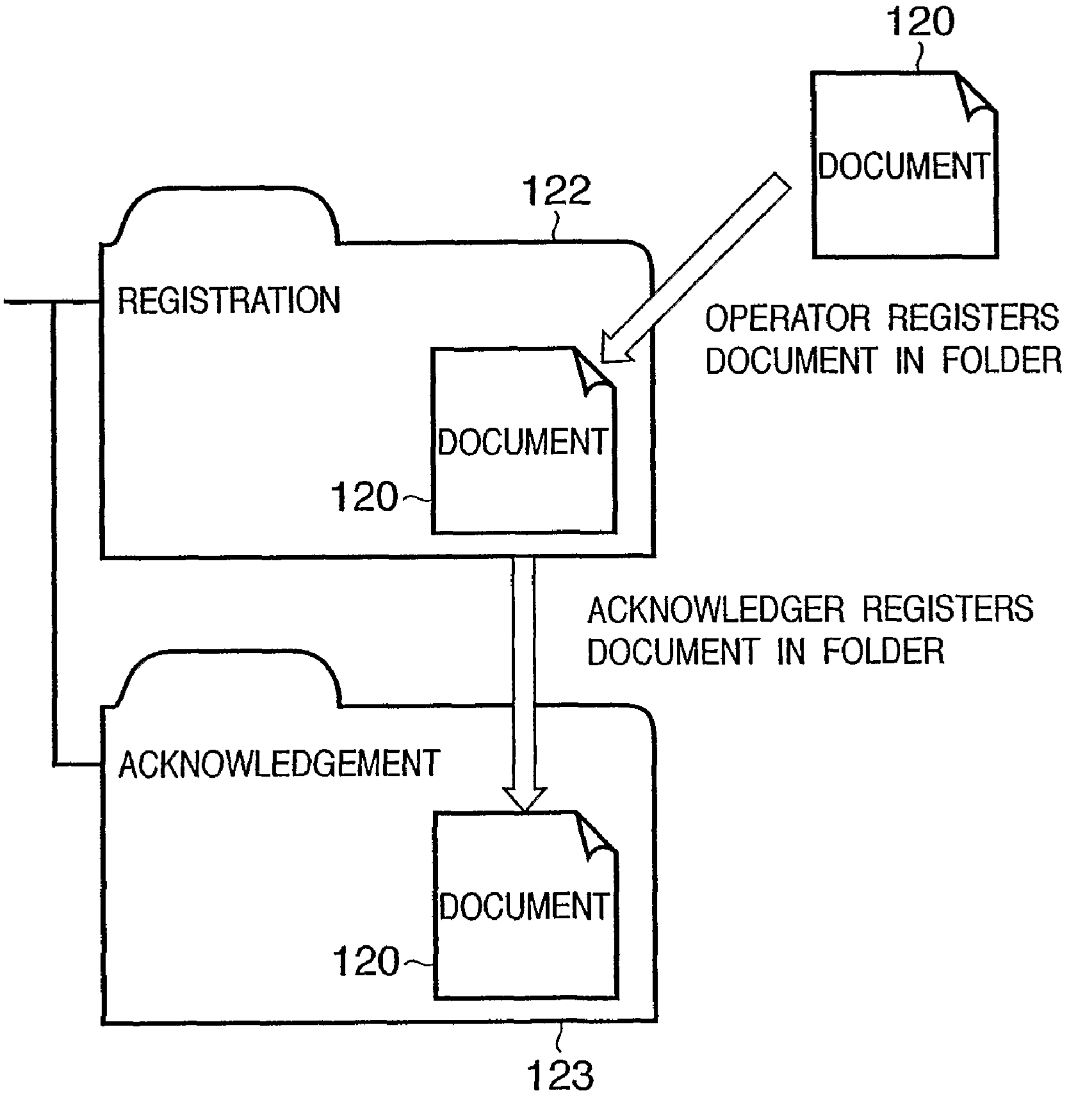
FIG. 15 depicts a view schematically showing folders and a document in a case where a work flow is implemented by moving the document between the folders in the document managing system according to the embodiment.

FIG. 15 is a diagram schematically showing folders and a document in a case where a work flow is implemented by moving the document between the folders in the document managing system according to the embodiment of the present invention.

Referring to FIG. 15, an operator and an acknowledger are registered in the document managing system, and a permission given to the operator and the acknowledger to register and change a document is set as information added to a registration folder 122. Also, a permission given only to the acknowledger to register and change a document is set as information added to an acknowledgement folder 123. In a case where such access limitations are set with the folders, the operator can register a document 120 in the registration folder 122 and perform an editing operation on the document 120 in the registration folder 122 but cannot move the document 120 from the registration folder 122 into the acknowledgement folder 123. On the other hand, the acknowledger can check the contents of the document 120 in the registration folder 122 and move the document 120 from the registration folder 122 into the acknowledgement folder 123.

Figure 16:
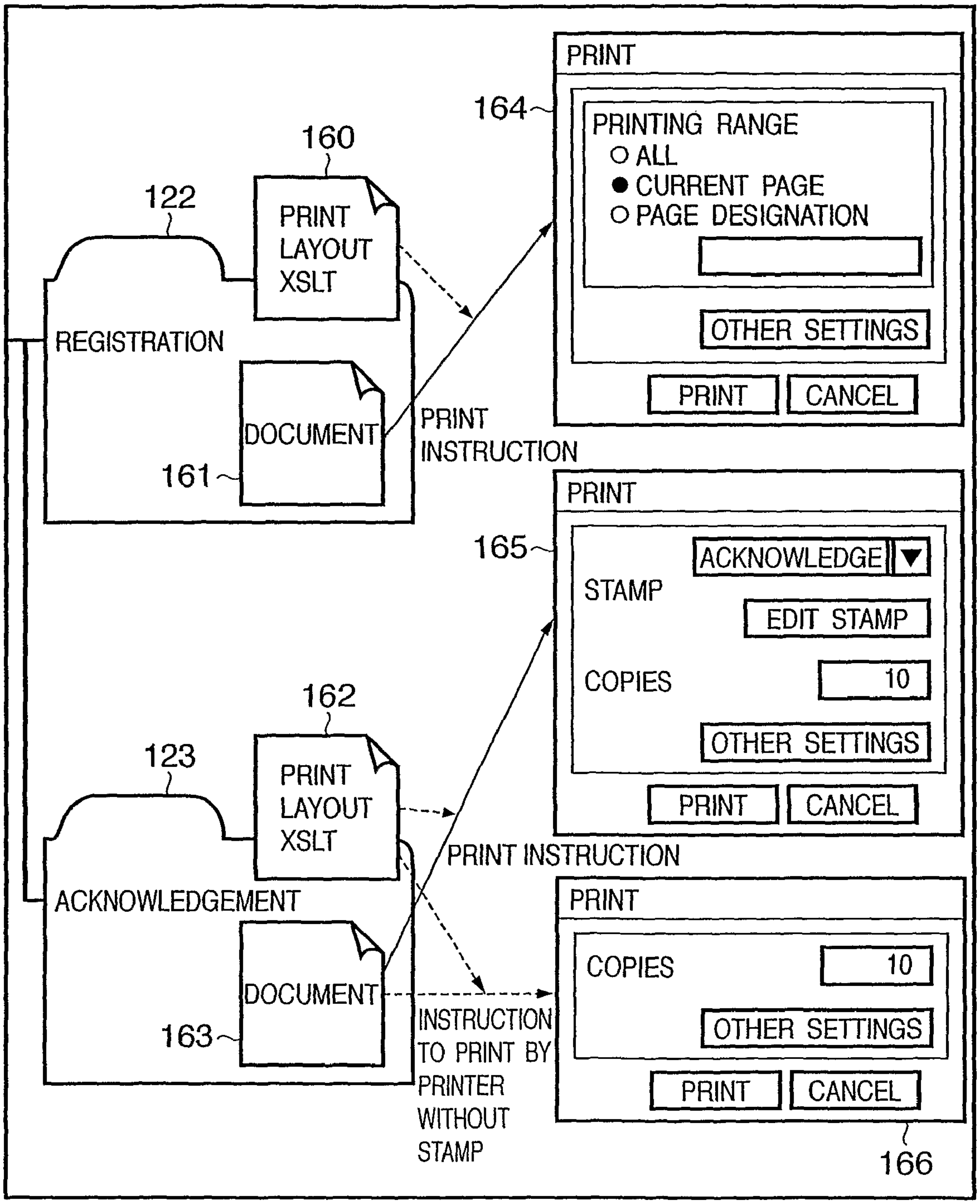
FIG. 16 depicts a view schematically showing folders, documents and print setting windows each displayed when one of the documents in the folders is printed in the document managing system according to the embodiment, in which a work flow is implemented by moving a document between folders.

FIG. 16 is a diagram schematically showing folders, documents and print setting windows each displayed, in a case where one of documents in the folders is printed in the document managing system according to the embodiment of the present invention, in which a work flow is implemented by moving a document between folders.

Referring to FIG. 16, a layout-changing XSLT style sheet 160 is registered in a registration folder 122 to display a print settings window 164, in which "Page Range" items are displayed and "Current Page" is selected as an initial value, for example, by considering document-check printing performed by an operator. When the operator selects a document 161 in the registration folder 122 and instructs to print the document, the same processing as that shown in the flowchart of FIG. 14 is performed by using the XSLT style sheet 160 for changing the layout of the print setting window, thereby displaying the print settings window 164, in which "Page Range" items are displayed and "Current Page" is selected as an initial value.

On the other hand, a print settings window 165 in which "Stamp" and "Print Copies" items are displayed is set in an acknowledgement folder 123, for example, with taking into consideration of formally submitting an acknowledged document. A layout-changing XSLT style sheet 162, for displaying a print settings window in which the "Stamp" item in particular is displayed in a large size is registered. When the user selects a document 163 in the acknowledgement folder 123 and instruct to print the document, the same processing as that shown in the flowchart of FIG. 14 is performed by using the XSLT style sheet 162 for changing the layout of the print setting window, thereby displaying the "Stamp" and "Print Copies" items as shown in the window 165. The "Stamp" item is displayed in a large size on the basis of the XSLT style sheet 162.

In a case where a printer having no stamp function is selected, if the same processing as that shown in the flowchart of FIG. 14 is performed by using the XSLT style sheet 162 for changing the layout of the print setting window, a print settings window 166 is displayed in which the setting items for the "Stamp" function not provided in the printer is deleted and the "Print Copies" item is only displayed.

Thus, the print settings window for a document is changed according to an XSLT style sheet in a folder in which the document is stored. Also, if the style sheet includes a setting item unrelated to the functions of a printer which prints the document, a print settings window having printing items except for the unrelated setting item is displayed.

Thus, in a document managing system in which the work flows are implemented, a print settings window according to the process of each work flow can be displayed.

<Display of Print Settings Window which Layout has been Changed According to Process of Work Flow>

Figure 17:
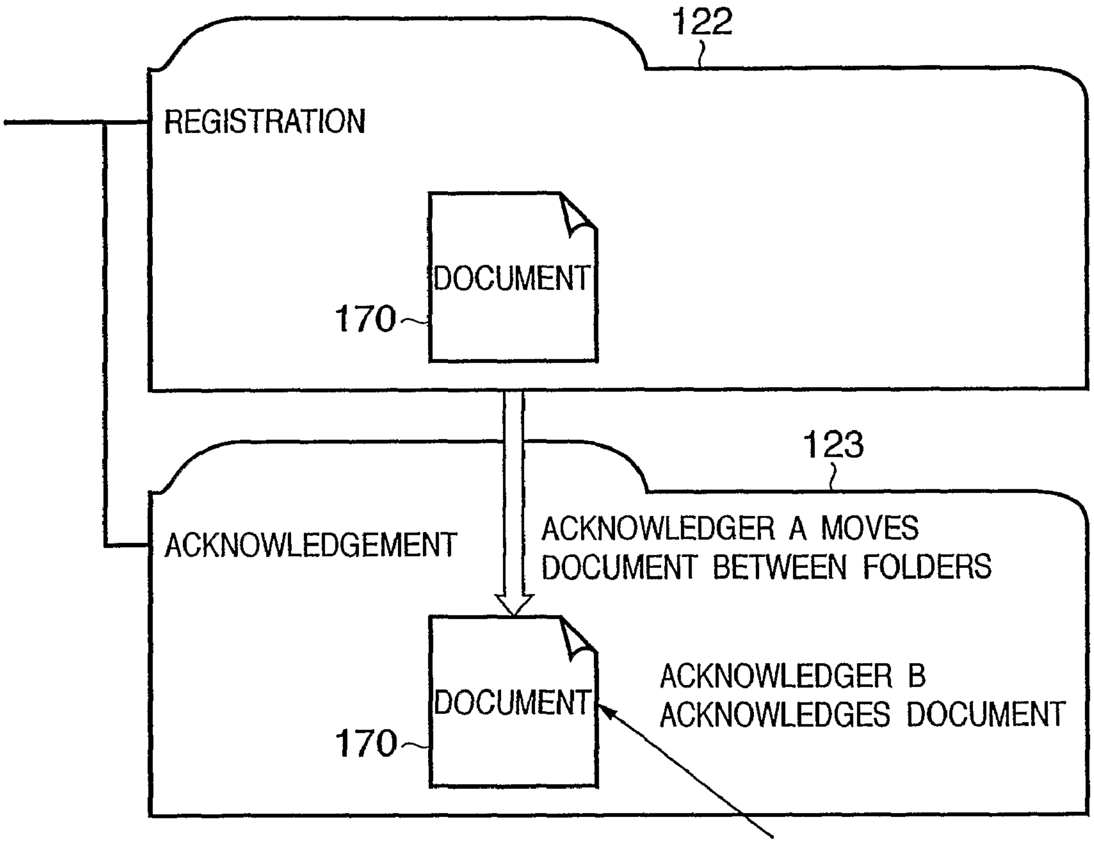
FIG. 17 is a diagram schematically showing folders and a document in the document managing system according to the embodiment of the present invention, in which a work flow is implemented by moving a document between folders and changing additional information on the document.

FIG. 17 is a diagram schematically showing folders and a document in the document managing system according to the embodiment of the present invention, in which a work flow is implemented by moving a document between folders and changing additional information on the document.

Referring to FIG. 17, an operator, an acknowledger A and an acknowledger A are registered in the document managing system; a permission given to the operator and the acknowledgers A and B to register and change a document is set as additional information on a registration folder 122; and a permission given only to the acknowledger A to register and change a document is set as additional information on an acknowledgement folder 123. In a case where such limitations of access to the folders are set with the folders, the operator can register a document 170 in the registration folder 122 and edit the document 170 in the registration folder 122 but cannot move the document 170 from the registration folder 122 into the acknowledgement folder 123.

On the other hand, each of the acknowledgers A and B confirms the contents of the document 170 in the registration folder 122 and can move the document 170 from the registration folder 122 into the acknowledgement folder 123. At this time, in the additional information on the moved document 170, information about acknowledgement by the acknowledger A or B who moved the document is changed from "undone" to "done".

The acknowledger B can perform, on an acknowledgement window (not shown), an acknowledging operation on the document 170 moved into the acknowledgement folder 123 by the acknowledger A to change the state of acknowledgement by the acknowledger B from "undone" to "done". Similarly, the acknowledger A can perform on the acknowledgement window an acknowledging operation on the document 170 moved into the acknowledgement folder 123 by the acknowledger B to change the state of acknowledgement by the acknowledger A from "undone" to "done".

Figure 18:
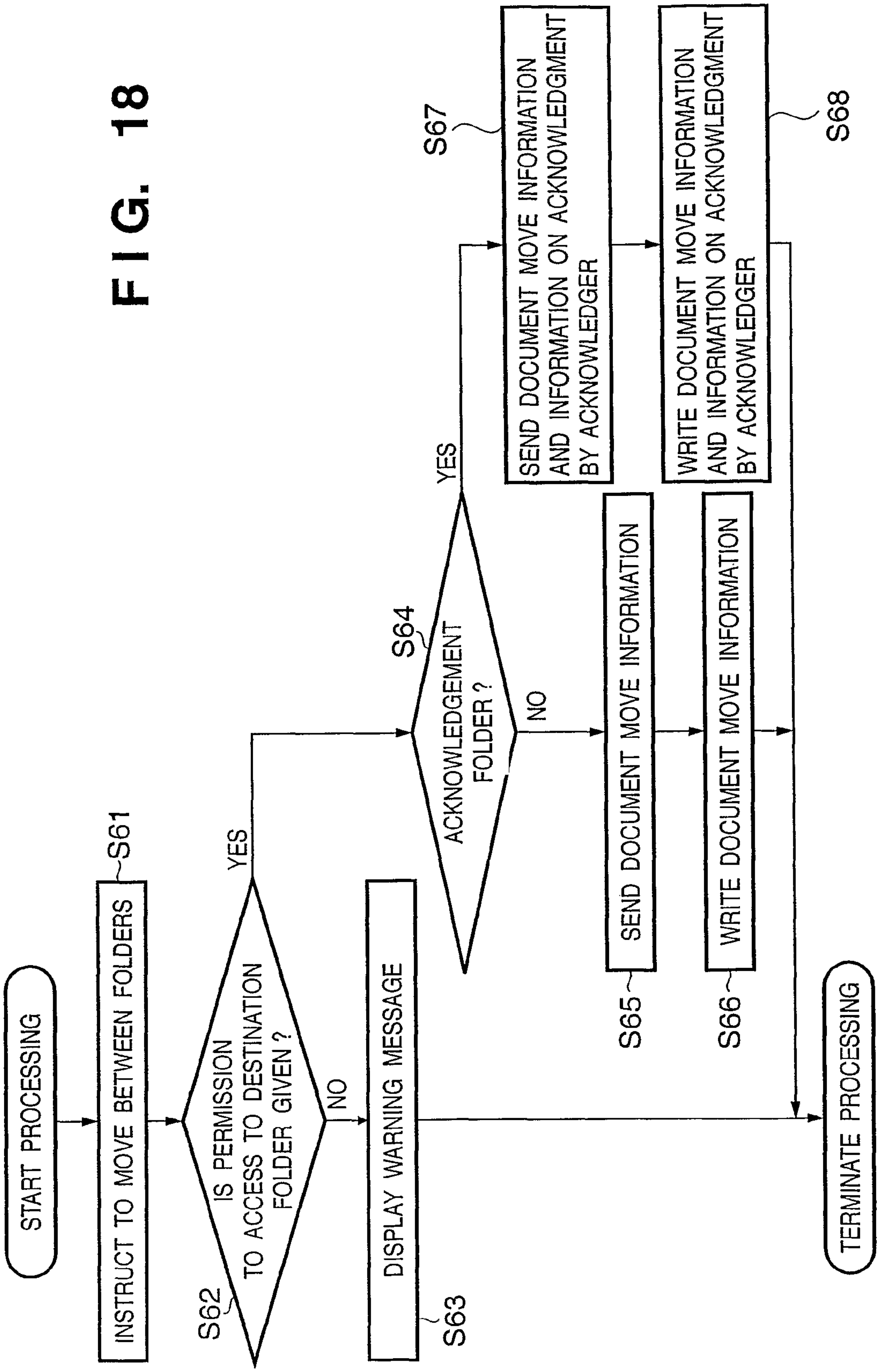
FIG. 18 is a flowchart showing change of the status of a document to an acknowledged status by moving the document into an acknowledgement folder and the process of changing the status of the document to the acknowledged status by acknowledgement processing.

FIG. 18 is a flowchart showing transfer of the status of a document to an acknowledged status by moving the document into the acknowledgement folder 123 and the process of transferring the status of the document to the acknowledged status by acknowledgement processing.

In step S61, a user selects using the input unit 1041 of the user interface 1001 and instructs to move the document to a different folder. In step S62, the document managing controller 1006 obtains access information stored in additional information on the move-destination folder obtained in advance, and based on the access information, it is determined whether or not the user gets a permission to write the document into the move-destination folder. If the user gets no permission, the flow advances to step S63 and a message indicating that "processing has ended in failure" is displayed on the display 1040 of the user interface 1001. Then the process ends.

If it is determined in step S62 that the user gets the permission, the flow advances to step S64 and the document managing controller 1006 checks the additional information on the move-destination folder obtained in advance and determines whether or not the move-destination folder is an acknowledgement folder 123. If the move-destination folder is not the acknowledgement folder 123, the flow advances to step S65 and the document managing controller 1006 transmits the document ID, the move-starting-point folder ID, the move-destination folder ID and a request for movement of the document between the folders to the server 1100 through the communication controller 1011. In step S66, the document managing controller 1107 of the server 1100 changes the information in the attribute database 1110 to move the document between the folders on the basis of the document ID, the move-starting-point folder ID and the move-destination folder ID. Thus, the process ends by executing only processing for moving the document between the folders.

If the move-destination folder is the acknowledgement folder 123 in the step S64, the flow advances to step S67 and the document managing controller 1006 transmits the document ID, the move-starting-point folder ID, the move-destination folder ID, a request for acknowledgement of the document and a request for movement of the document between the folders to the server 1100 through the communication controller 1011. In step S68, the document managing controller 1107 of the server 1100 changes the information in the attribute database 1110 to move the document between the folders on the basis of the document ID, the move-starting-point folder ID and the move-destination folder ID, and stores, on the basis of the user ID of the acknowledger, a change in acknowledgement information in the additional information on the document from "unacknowledged" to "acknowledged" made by the acknowledger, thus completing processing for moving the document between the folders and document acknowledgement processing.

Figure 19:
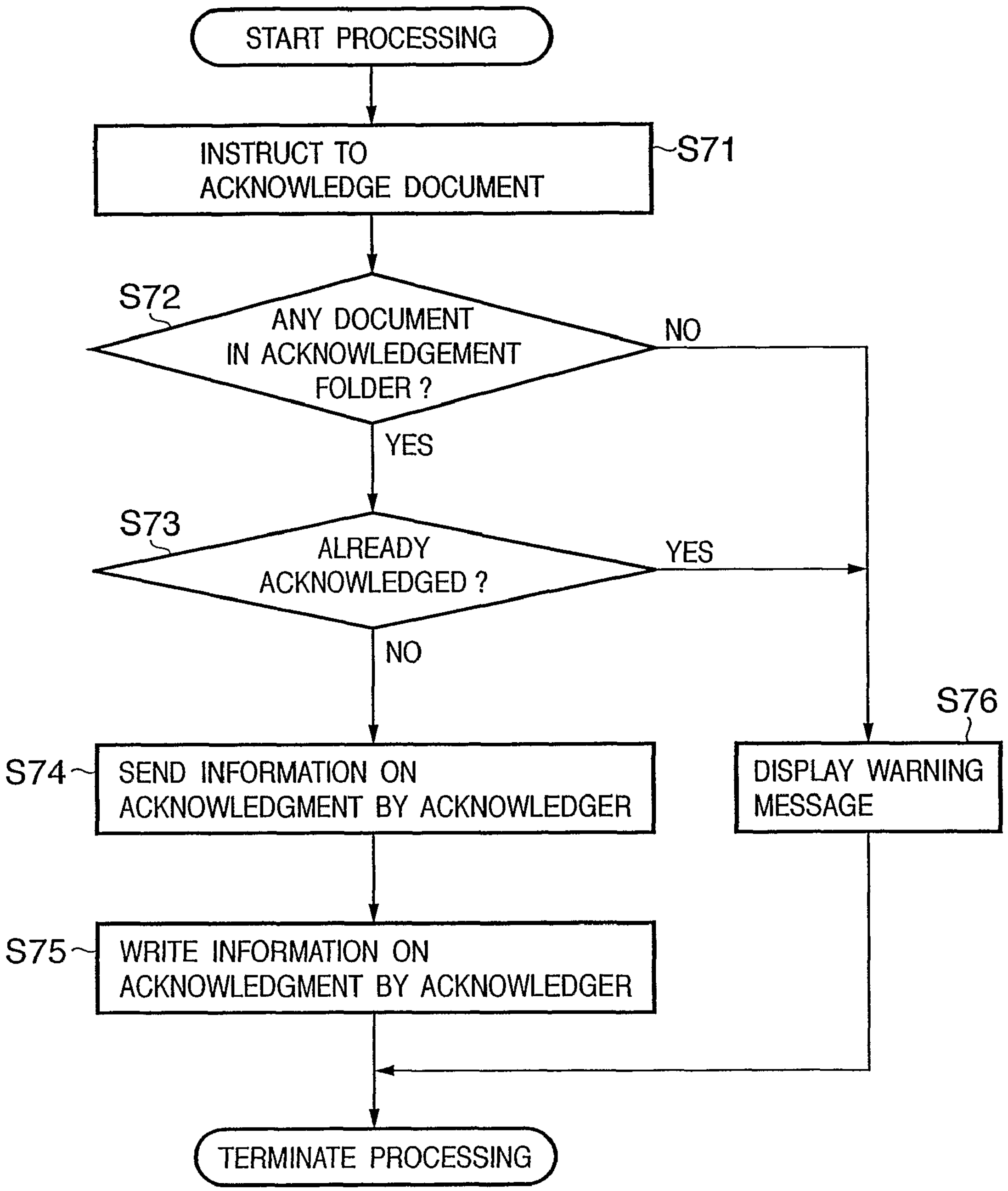
FIG. 19 is a flowchart for explaining processing for designating and acknowledging a document in an acknowledgement folder.

FIG. 19 is a flowchart for explaining processing for designating and acknowledging a document in an acknowledgement folder 123.

In step S71, a user selects a document using the input unit 1041 of the user interface 1001 and instructs to acknowledge the document. In step S72, the document managing controller 1006 checks additional information of the folder containing the document and determines whether or not the folder is the acknowledgement folder 123. If the folder containing the document is not the acknowledgement folder 123, the flow advances to step S76 and the document managing controller 1006 displays a message indicating that "processing has ended in failure" on the display 1040 of the user interface 1001.

If it is determined in step S72 that the selected document exists in the acknowledgement folder 123, the flow advances to step S73 and the document managing controller 1006 checks the additional information of the document and determines whether or not the user has already acknowledged the document. If the user has already acknowledged the document, the flow advances to step S76 and the document managing controller 1006 displays a message indicating that "the document has already been acknowledged" by the user on the display 1040 of the user interface 1001. If it is determined in step S73 that the document has not yet been acknowledged, the flow advances to step S74 and the document managing controller 1006 sends the document ID, the acknowledger user ID and a request for acknowledgement of the document to the server 1100 through the communication controller 1011. In step S75, the document managing controller 1107 of the server 1100 receives the request, and stores, on the basis of the user ID of the acknowledger, a change in acknowledgement information in the additional information of the document from "unacknowledged" to "acknowledged" made by the acknowledger, thus completing document acknowledgement processing.

Figure 20:
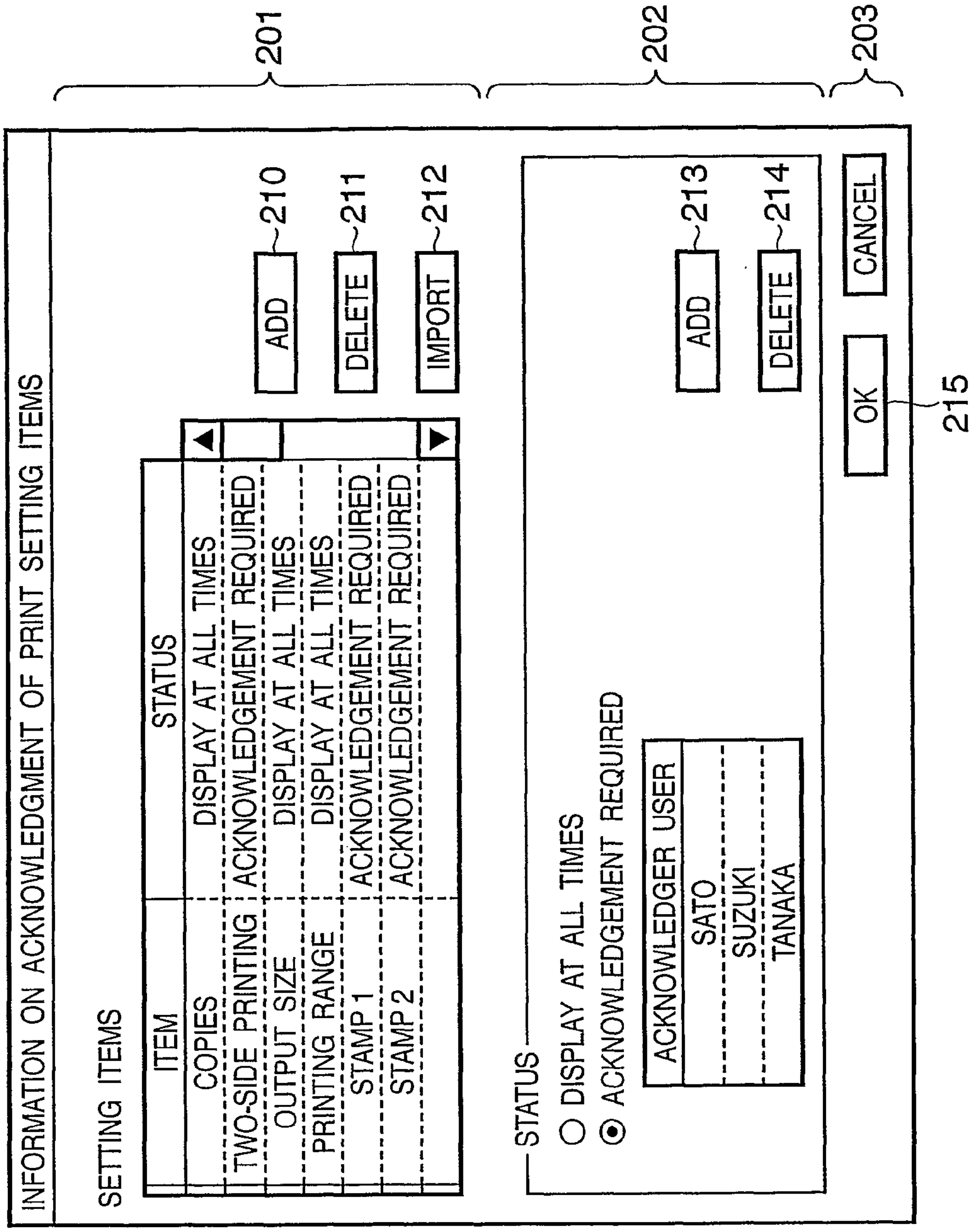
FIG. 20 depicts a view for explaining a settings window for changing print setting items according to the unacknowledged/acknowledged status of a document.

FIG. 20 is a diagram for explaining a settings window for changing print setting items according to the unacknowledged/acknowledged status of a document.

In FIG. 20, reference numeral 201 denotes an area for selection of print setting items, reference numeral 202 denotes an area for providing an instruction to change the state of display of each selecting print setting item, reference numeral 203 denotes an area for providing an instruction to store or cancel a setting result.

When an "Add" button 210 in the area 201 is clicked, a settings window (not shown) for newly adding a setting item is displayed to enable a print setting item to be newly added. When one of items in a "Setting Item" list in the area 201 is selected, the selected item can be removed by clicking a "Delete" button 211. When an "Import" button 212 in the area 201 is clicked, a settings window (not shown) for addition of setting items from a selected printer driver is displayed to enable setting items of the selected printer driver to be added.

In the area 202, the display setting of a selected one of the items in the area 201 can be changed. For example, if a "Display at All Times" radio button in the area 202 is selected, this print setting item is displayed at all times regardless of the unacknowledged/acknowledged status of the document. If an "Acknowledgement Required" radio button is selected in the area 202, this print setting item is not displayed unless all users in an "Acknowledger" list acknowledge the document. If an "Add" button 213 displayed on the right-hand side of the "Acknowledger User" list is clicked, a settings window (not shown) for newly adding a user responsible for management in the document managing system is displayed to enable addition of a new acknowledger. If an "Delete" button 214 is clicked by selecting an acknowledger from the acknowledger user list, the selected acknowledger is deleted from the acknowledger user list.

If an "OK" button 215 in the area 203 is clicked, print setting items and acknowledgement information set by using this window are stored in the attribute database 1110 of the server 1100. If a "Cancel" button is clicked, the items set by operations performed as described above are erased without being registered.

Figure 21:
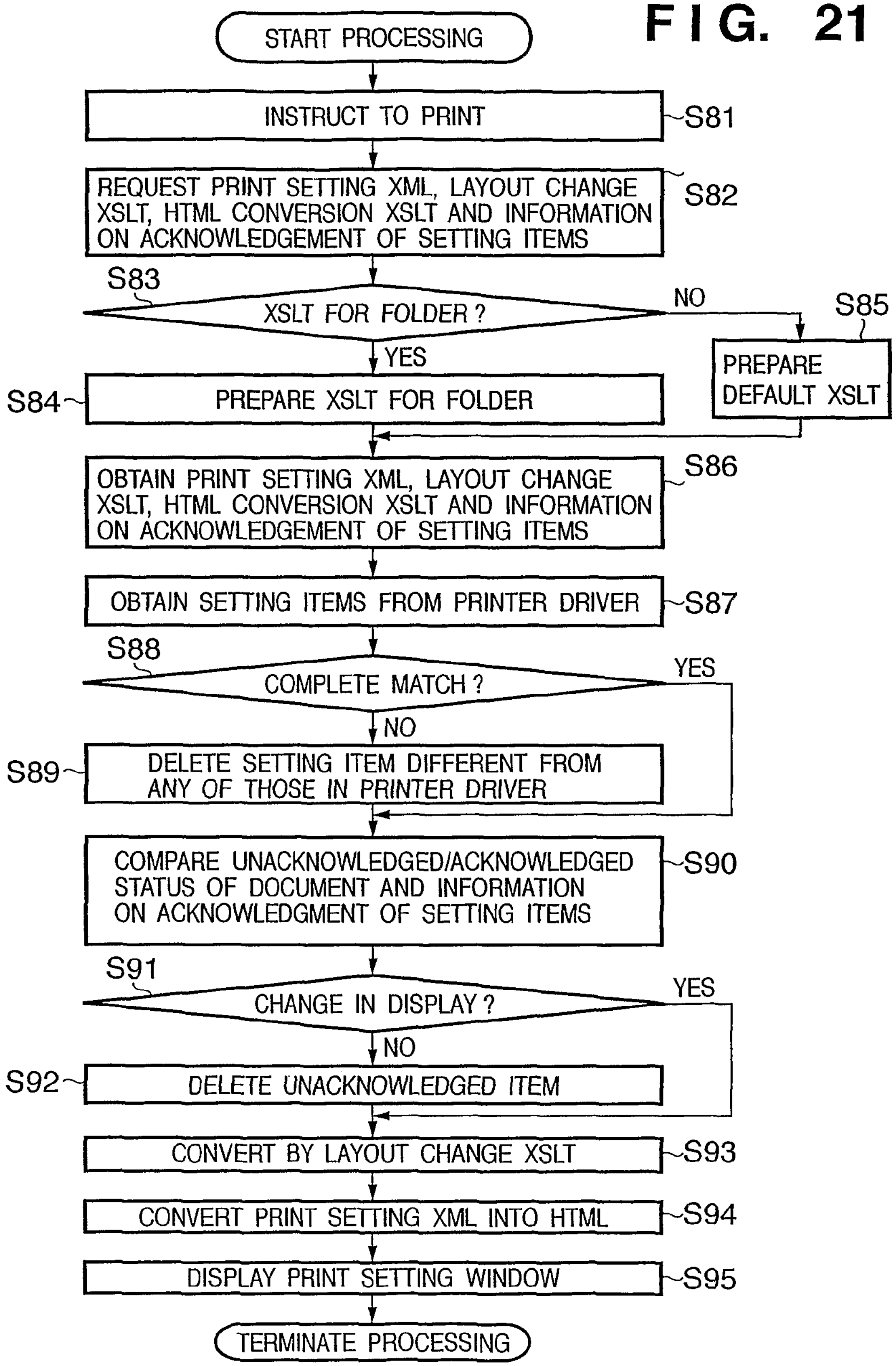
FIG. 21 is a flowchart for explaining processing for displaying a print settings window from print setting XML data and information about changes in layout of a print settings window for a folder according to the embodiment.

FIG. 21 is a flowchart for explaining processing for displaying a print settings window based on the print setting XML data 800 and information about changes in layout of a print settings window for a folder according to this embodiment.

In step S81, a user selects a document by using the input unit 1041 of the user interface 1001 and instructs printing. In step S82, the document managing controller 1006 receives the print instruction and requests, to the server 1100, through the communication controller 1011, the XML data 800 for the print setting window, HTML-conversion XSLT style sheet 801, XSLT style sheet 130 for changing the layout of print settings window for the folder, and print setting item acknowledgement information described above with reference to FIG. 20. In step S83, the document managing controller 1107 of the server 1100 receives the request and confirms additional information of the selected folder stored in the attribute database 1110. If the XSLT style sheet 130 for changing the layout of the print settings window is stored in the selected folder, the flow advances to step S84 and the document managing controller 1107 obtains the XSLT style sheet 130. If no corresponding XSLT style sheet 130 is stored, the flow advances to step S85 and the document managing controller 1107 obtains the default XSLT style sheet in the attribute database 1110.

After execution of step S84 or step S85, the flow advances to step S86 and the document managing controller 1107 of the server 1100 receives the request and sends the XML data 800 for the print setting window, HTML-conversion XSLT style sheet 801 and XSLT style sheet 130 for changing the layout of print settings window in the attribute database 1110 to the client 1000 through the communication controller 1101. In step S87, the document managing controller 1006 of the client 1000 identifies a printer to be used, for example, based on information in a memory managed by the OS of the client 1000, and obtains print setting items from the corresponding printer driver. For example, if the printer 1500 has been selected as a printer to be used by the client 1000, the document managing controller 1006 obtains print setting items from the printer driver 1021. If the printer 1600 has been selected, the document managing controller 1006 obtains print setting items from the printer driver 1022.

In step S88, the document managing controller 1006 of the client 1000 develops the XSLT style sheet 130 for changing the layout of the print settings window into a memory by using the XSL parser 1302, and obtains print setting items from the style sheet 130. The controller 1006 then compares the obtained print setting items with the print setting items of the selected printer. If there is a print setting item being different from any of the print setting items of the selected printer in the XSLT style sheet 130 for changing the layout of the print setting window, the flow advances to step S89, and deletes the print setting item being different from any of the print setting items of the selected printer from the XSLT style sheet 130 for changing the layout of the print setting window. The flow then advances to step S90. In the case of a complete match between the compared setting items in step S88, the flow moves from step S88 to step S90.

In step S90, the document managing controller 1006 of the client 1000 compares the print setting item acknowledgement information and the unacknowledged/acknowledged status of the selected document in the additional information on the document, so as to identify any of the items in the print settings window not displayable due to the “unacknowledged” status. In step S91, the document managing controller 1006 of the client 1000 develops the XSLT style sheet 130 for changing the layout of the print settings window in a memory by using the XSL parser 1302 and obtains the print setting items from the style sheet 130. If any one of the setting items in the XSLT style sheet 130 for changing the layout of the print settings window cannot be displayed due to the “unacknowledged” status, the flow advances to step S92 and the document managing controller 1006 removes the unacknowledged setting item from the XSLT style sheet 130 for changing the layout of the print setting window. The flow then advances to step S93. In step S93, the document managing controller 1006 of the client 1000 prepares XML data for the print settings window by using the XSLT processor 1030 on the basis of the received XML data 800 for the print settings window and the received XSLT style sheet 130 for changing the layout of the print setting window. In step S94, the document managing controller 1006 of the client 1000 prepares HTML data 132 for the print settings window by using the XSLT processor 1030 on the basis of the received XML data 800 for the print settings window and XSLT style sheet 130 for HTML conversion. In step S95, the document managing controller 1006 of the client 1000 prepares the print settings window on the basis of the HTML data 132 for the print settings window and displays the print settings window on the display 1040 of the user interface 1001 by using the HTML display 1031.

Figure 22:
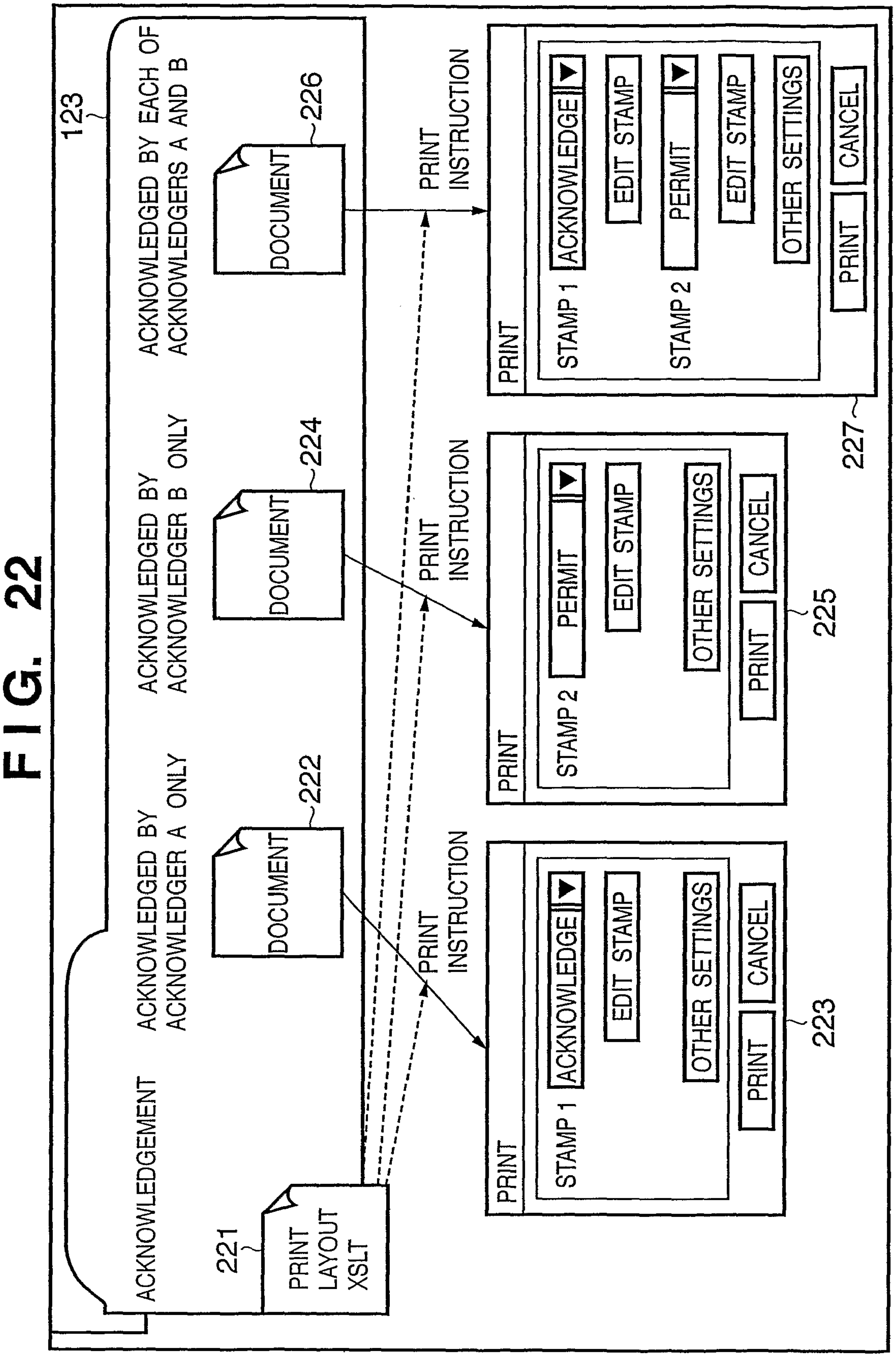
FIG. 22 is a diagram schematically showing folders, documents and print setting windows each displayed when one of the documents in the folders is printed in the document managing system in which a work flow is implemented by moving a document between folders and by changing additional information on the document.

FIG. 22 is a diagram schematically showing folders, documents and print setting windows each displayed, in a case where one of the documents in the folders is printed in the document managing system in which a work flow is implemented by moving a document between folders and by changing additional information of the document.

Referring to FIG. 22, “Stamp 1” and “Stamp 2” items are displayed for an acknowledgement folder 123, for example, with taking into consideration of formally submitting an acknowledged document. A layout-changing XSLT style sheet 221 for displaying a print settings window to be displayed in a large size is registered for the “Stamp 1” item. For example, it is assumed here that, for example, with respect to the settings window shown in FIG. 20, a setting has been made such that an acknowledgement by the acknowledger A is required for display of the “Stamp 1” item in the print setting and an acknowledgement by the acknowledger B is required for display of the “Stamp 2” item.

If a printing instruction is provided after selecting a document 222 acknowledged by the acknowledger A only, a print settings window 223 in which only the “Stamp 1” item is displayed in a large size is displayed as a result the same processing as that in the flowchart of FIG. 21 using XSLT style sheet 221 for changing the layout of the print setting window.

Similarly, if a printing instruction is provided after selecting a document 224 acknowledged by the acknowledger B only, a print settings window 225 in which only the “Stamp 2” item is displayed in a large size is displayed as a result the same processing as that in the flowchart of FIG. 21 using the XSLT style sheet 221 for changing the layout of the print setting window.

Similarly, if a printing instruction is provided after selecting a document 226 acknowledged by each of acknowledgers A and B, a print settings window 227 in which both the “Stamp 1” and “Stamp 2” items are displayed, and in which the “Stamp 1” item is displayed in a larger size, is displayed as a result the same processing as that in the flowchart of FIG. 21 using XSLT style sheet 221 for changing the layout of the print setting window.

Thus, according to the document managing system in which the work flows are implemented, a print settings window is displayed according to the process of each work flow.

In this embodiment, an XSLT style sheet for changing the layout of a print settings window is stored as additional information of each of folders in the document managing system to enable the layout of the print settings window for each folder registering document to be changed. However, needless to say, an XSLT style sheet for changing the layout of a print settings window may be stored as additional information of each of documents to enable the layout of the print settings window for each document to be changed.

Other Embodiments

The object of the present invention can also be attained by providing a system or an apparatus with a recording medium on which program codes of a piece of software for realizing the functions of the embodiment, and operating a computer (or CPU or MPU) of the system of apparatus so that the computer reads out and executes the program codes stored on the storage medium, as described above. In such a case, the program codes themselves, read out from the storage medium, realize the above-described functions of the embodiment, and the storage medium on which the program codes are stored constitutes the present invention. For example, as a storage medium for supplying such program codes, a floppy (trademark) disk, a hard disk, an optical disk, a magneto-optical disk, a compact-disk read-only memory (CD-ROM), compact disk-recordable (CD-R), a magnetic tape, a nonvolatile memory card or a ROM can be used.

The present invention comprises not only executing the program codes read out by the computer to realize the functions of the above-described embodiment but also making an operating system (OS) which runs on the computer perform part or the whole of actual processing according to instructions based on the program codes to realize the functions of the above-described embodiment.

Further, the present invention comprises a case where the program codes read out from the storage medium are written to a memory provided in a function expansion board inserted in the computer or a function expansions unit connected to the computer, and a computer provided in the expansion board or the function expansions unit performs part or the whole of actual processing to realize the functions of the above-described embodiment.

The present invention is not limited to the above embodiment, and various changes and modifications can be made thereto within the spirit and scope of the present invention. Therefore, to apprise the public of the scope of the present invention, the following claims are made.

CLAIM OF PRIORITY

This application claims priority from Japanese Patent Application No. 2004-257422 filed on Sep. 3, 2004, which is hereby incorporated by reference herein.

The invention claimed is:

1. An information processing apparatus which communicates with a printer, comprising:

a definition unit that defines a first print setting item of a first document and a second print setting item of a second document different from the first document;

a setting unit that sets a first print setting value used to print the first document to the first print setting item and sets a second print setting value used to print the second document to the second print setting item; and a display unit that displays a first print setting screen in which the first print setting value is set to the first print setting item in a case where an instruction is provided to print the first document, and displays a second print setting screen in which the second print setting value is set to the second print setting item in a case where an instruction is provided to print the second document, wherein the first print setting item included in the first print setting screen is different from the second print setting item included in the second print setting screen.

2. The apparatus according to claim 1, further comprising:

a deleting unit that deletes a print setting item regarding a function on which the printer does not have, from a plurality of print setting items included in the first or second print setting screen.

3. The apparatus according to claim 1, wherein the print setting item included in the first print setting screen for the first document acknowledged by a first acknowledger is different from the print setting item included in the first print setting screen for the first document acknowledged by a second acknowledger.

4. An information processing method of an information processing apparatus which communicates with a printer, the method comprising:

defining a first print setting item of a first document and a second print setting item of a second document different from the first document;

setting a first print setting value used to print the first document to the first print setting item and sets a second print setting value used to print the second document to the second print setting item; and displaying a first print setting screen in which the first print setting value is set to the first print setting item in a case where an instruction is provided to print the first document, and displaying a second print setting screen in which the second print setting value is set for the second print setting item in a case where an instruction is provided to print the second document, wherein the first print setting item included in the first print setting screen is different from the second print setting item included in the second print setting screen.

5. The method according to claim 4, further comprising:

deleting a print setting item regarding a function on which the printer does not have, from a plurality of print setting items included in the first or second print setting screen.

6. The method according to claim 4, wherein the print setting item included in the first print setting screen for the first document acknowledged by a first acknowledger is different from the print setting item included in the first print setting screen for the first document acknowledged by a second acknowledger.

7. A non-transitory computer readable storage medium storing a program for causing a computer to implement an information processing method of an information processing apparatus which communicates with a printer, the method comprising:

defining a first print setting item of a first document and a second print setting item of a second document different from the first document;

setting a first print setting value used to print the first document to the first print setting item and sets a second print setting value used to print the second document to the second print setting item; and displaying a first print setting screen in which the first print setting value is set to the first print setting item in a case where an instruction is provided to print the first document, and displaying a second print setting screen in which the second print setting value is set for the second print setting item in a case where an instruction is provided to print the second document, wherein the first print setting item included in the first print setting screen is different from the second print setting item included in the second print setting screen.

8. The storage medium according to claim 7, further comprising:

deleting a print setting item regarding a function on which the printer does not have, from a plurality of print setting items included in the first or second print setting screen.

9. The storage medium according to claim 7, wherein the print setting item included in the first print setting screen for the first document acknowledged by a first acknowledger is different from the print setting item included in the first print setting screen for the first document acknowledged by a second acknowledger.

* * * * *